United States Patent
Jeon

(10) Patent No.: US 11,961,428 B2
(45) Date of Patent: Apr. 16, 2024

(54) METHOD AND DEVICE FOR PROCESSING IMAGE

(71) Applicant: SAMSUNG ELECTRONICS CO., LTD., Suwon-si (KR)

(72) Inventor: Kangwon Jeon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/743,019

(22) Filed: May 12, 2022

(65) Prior Publication Data

US 2022/0375373 A1 Nov. 24, 2022

Related U.S. Application Data

(63) Continuation of application No. PCT/KR2022/095094, filed on May 3, 2022.

(30) Foreign Application Priority Data

May 20, 2021 (KR) .......... 10-2021-0064977
Aug. 25, 2021 (KR) .......... 10-2021-0112468

(51) Int. Cl.
*H04N 13/00* (2018.01)
*G09G 3/00* (2006.01)
(Continued)

(52) U.S. Cl.
CPC .......... *G09G 3/001* (2013.01); *G09F 19/125* (2021.05); *G09G 2320/02* (2013.01);
(Continued)

(58) Field of Classification Search
CPC ...... G09G 3/001; G09G 2340/12; G09G 3/00; H04N 13/305; H04N 13/31; H04N 13/00
See application file for complete search history.

(56) References Cited

U.S. PATENT DOCUMENTS 8,872,904 B1    10/2014  Hwang et al.
9,532,038 B2    12/2016  Berretty
(Continued)

FOREIGN PATENT DOCUMENTS

KR    10-2007-0019644 A    2/2007
KR    10-2012-0010363 A    2/2012
(Continued)

OTHER PUBLICATIONS

International Search Report (PCT/ISA/220 and PCT/ISA/210) and Written Opinion (PCT/ISA/237) dated Aug. 10, 2022 by the International Searching Authority in International Application No. PCT/KR2022/095094.

*Primary Examiner* — Roy P Rabindranath
(74) *Attorney, Agent, or Firm* — Sughrue Mion, PLLC

(57) ABSTRACT

Provided is a method including: obtaining a plurality of images corresponding to a plurality of views; identifying at least one view region overlapping with a sub-pixel from among a plurality of view regions corresponding to the plurality of views; identifying a data value corresponding to the sub-pixel for each of at least one image corresponding to the at least one view region; determining an application degree of the data value for each of the at least one image, based on a level of overlap between the sub-pixel and the at least one view region, and determining an output value of the sub-pixel based on a data value adjusted according to the determined application degree; and outputting an image based on output values respectively determined for a plurality of sub-pixels including the sub-pixel.

20 Claims, 30 Drawing Sheets

(51) Int. Cl.
*G09F 19/12* (2006.01)
*H04N 13/305* (2018.01)
*H04N 13/31* (2018.01)

(52) U.S. Cl.
CPC ......... *G09G 2340/12* (2013.01); *H04N 13/00* (2013.01); *H04N 13/305* (2018.05); *H04N 13/31* (2018.05)

(56) References Cited

U.S. PATENT DOCUMENTS

| | | |
|---|---|---|
| 9,728,111 B2 | 8/2017 | Guo et al. |
| 10,021,375 B2 | 7/2018 | Kim et al. |
| 10,264,246 B2 | 4/2019 | Baek et al. |
| 10,771,771 B2 | 9/2020 | Hwang et al. |
| 2007/0018585 A1 | 1/2007 | Ijzerman et al. |
| 2012/0019518 A1* | 1/2012 | Kim .................... H04N 13/317 345/419 |
| 2016/0345001 A1* | 11/2016 | Baek .................... H04N 13/351 |

FOREIGN PATENT DOCUMENTS

| | | |
|---|---|---|
| KR | 10-2014-0137971 A | 12/2014 |
| KR | 10-2015-0002159 A | 1/2015 |
| KR | 10-2016-0136831 A | 11/2016 |
| KR | 102081111 B1 | 2/2020 |
| KR | 10-2142480 B1 | 8/2020 |
| KR | 10-2271171 B1 | 7/2021 |
| KR | 10-2370062 B1 | 3/2022 |

\* cited by examiner

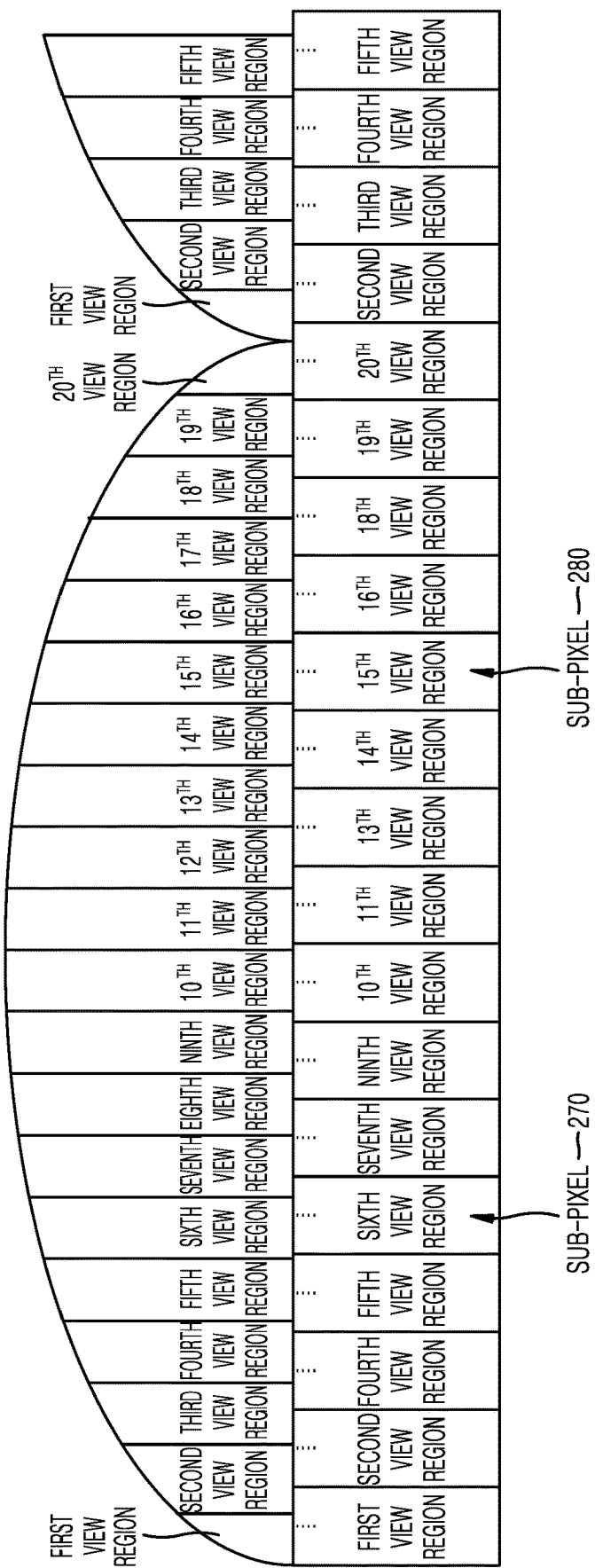

FIG. 5B

| VIEW REGION | AREA | APPLICATION DEGREE |
|---|---|---|
| 10<sup>TH</sup> VIEW VIEW REGION | 0.146748 | 0.009746 |
| FIRST VIEW REGION | 3.29185 | 0.218627 |
| SECOND VIEW REGION | 5.21 | 0.346021 |
| THIRD VIEW REGION | 4.91281 | 0.326283 |
| FOURTH VIEW REGION | 1.49549 | 0.099322 |
| | sum: 15.0569 | sum: 1.0 |

SECOND COLUMN
|
560

THIRD COLUMN
|
570

FIG. 6C

| VIEW REGION | CENTER COORDINATE | APPLICATION DEGREE | NORMALIZED APPLICATION DEGREE |
|---|---|---|---|
| 10$^{TH}$ VIEW VIEW REGION | ~~5.5~~ | 0 | 0 |
| FIRST VIEW REGION | 6.5 | 0.7652 | 0.2459 |
| SECOND VIEW REGION | 7.5 | 1.0 | 0.3213 |
| THIRD VIEW REGION | 8.5 | 1.0 | 0.3213 |
| FOURTH VIEW REGION | 9.5 | 0.3472 | 0.1116 |
| | SECOND COLUMN 660 | THIRD COLUMN 670 | sum : 1.0 FOURTH COLUMN 680 |

FIG. 7C

| VIEW REGION | CENTER COORDINATE | DISTANCE TO CENTER OF SUB-PIXEL | APPLICATION DEGREE | NORMALIZED APPLICATION DEGREE |
|---|---|---|---|---|
| 10$^{TH}$ VIEW VIEW REGION | ~~5.5~~ | - | - | 0 |
| FIRST VIEW REGION | 6.5 | 1.285 | 0.77821 | 0.124143 |
| SECOND VIEW REGION | 7.5 | 0.285 | 3.50877 | 0.559731 |
| THIRD VIEW REGION | 8.5 | 0.715 | 1.3986 | 0.22311 |
| FOURTH VIEW REGION | 9.5 | 1.715 | 0.58309 | 0.093017 |
|  |  |  |  | sum: 1.0 |

SECOND COLUMN — 760
THIRD COLUMN — 770
FOURTH COLUMN — 780
FIFTH COLUMN — 790

FIG. 8B

| VIEW REGION | AREA | AREA | APPLICATION DEGREE |
|---|---|---|---|
| 10$^{TH}$ VIEW VIEW REGION | ~~0.146748~~ | 0 | 0 |
| FIRST VIEW REGION | 3.29185 | 3.29185 | 0.220778 |
| SECOND VIEW REGION | 5.21 | 5.21 | 0.349425 |
| THIRD VIEW REGION | 4.91281 | 4.91281 | 0.329493 |
| FOURTH VIEW REGION | 1.49549 | 1.49549 | 0.1003 |
| | sum:15.0569 | sum: 14.9102 | sum: 1.0 |

SECOND COLUMN — 860
THIRD COLUMN — 865
FOURTH COLUMN — 870

FIG. 8C

| VIEW REGION | AREA | AREA RATIO | AREA RATIO | APPLICATION DEGREE |
|---|---|---|---|---|
| 10$^{TH}$ VIEW VIEW REGION | 0.146748 | ~~0.009746~~ | - | - |
| FIRST VIEW REGION | 3.29185 | 0.218627 | 0.218627 | 0.245241 |
| SECOND VIEW REGION | 5.21 | 0.346021 | 0.346021 | 0.388143 |
| THIRD VIEW REGION | 4.91281 | 0.326283 | 0.326283 | 0.366002 |
| FOURTH VIEW REGION | 1.49549 | ~~0.099322~~ | - | - |
| | sum: 15.0569 | sum: 1.0 | sum: 0.891478 | sum: 1.0 |

SECOND COLUMN — 880
THIRD COLUMN — 885
FOURTH COLUMN — 890
FIFTH COLUMN — 895

METHOD AND DEVICE FOR PROCESSING IMAGE

CROSS-REFERENCE TO RELATED APPLICATIONS

This application is a bypass continuation application of International Application No. PCT/KR2022/095094, filed on May 3, 2022, which is based on and claims priority under 35 U.S.C. § 119 to Korean Patent Application No. 10-2021-0064977 filed on May 20, 2021 and Korean Patent Application No. 10-2021-0112468 filed on Aug. 25, 2021 in the Korean Intellectual Property Office, the disclosures of which are incorporated by reference herein in their entireties.

BACKGROUND

1. Field

The disclosure relates to a method for processing an image, and an electronic device therefor and, more particularly, to a method for determining an output value of a sub-pixel in an image and an electronic device therefor.

2. Description of Related Art

Recently, a display enabled for a user to view different images according to viewing positions is introduced, and thus, there is increasing interest in a technique capable of effectively reducing an artifact.

According to current technologies, an output value of a sub-pixel is determined by mapping one or two view regions to the sub-pixel. In this case, an image showing a smooth change on a boundary of a view region may be output, but a problem occurs, in which an artifact of a cogwheel shape occurs on the boundary in a particular direction or an artifact of a stripe pattern occurs in a vertical direction to a grain of a lens in a homogeneous region.

In related art, a display device determines an output value of a sub-pixel by mapping one or two view regions to a sub-pixel. In particular, in a case where the display device maps a data value of an image corresponding to a dominant view region to an output value of the sub-pixel, when a boundary of a view region does not match a boundary of the sub-pixel, an artifact occurs in an output image.

SUMMARY

According to an embodiment of the disclosure, a method may include: obtaining a plurality of images corresponding to a plurality of views; identifying at least one view region overlapping with a sub-pixel from among a plurality of view regions corresponding to the plurality of views; identifying a data value corresponding to the sub-pixel for each of at least one image corresponding to the at least one view region; determining an application degree of the data value for each of the at least one image, based on a level of overlap between the sub-pixel and the at least one view region, and determining an output value of the sub-pixel based on a data value adjusted according to the determined application degree; and outputting an image based on output values respectively determined for a plurality of sub-pixels including the sub-pixel.

In an embodiment of the disclosure, as the level of overlap between the sub-pixel and the at least one view region increases, the application degree of the data value increases.

In an embodiment of the disclosure, the level of overlap between the sub-pixel and the at least one view region is determined based on an area of overlap between the sub-pixel and the at least one view region.

In an embodiment of the disclosure, as the area of overlap increases, the level of overlap between the sub-pixel and the at least one view region increases.

In an embodiment of the disclosure, the level of overlap between the sub-pixel and the at least one view region may be determined based on a length of overlap between the sub-pixel and a center line of the at least one view region.

In an embodiment of the disclosure, as the length of overlap increases, the level of overlap between the sub-pixel and the at least one view region increases.

In an embodiment of the disclosure, the at least one view region may be a view region whose area overlapping with the sub-pixel is equal to or greater than a predetermined value.

In an embodiment of the disclosure, the at least one view region may be a view region whose value is equal to or greater than a predetermined value, the value being obtained by dividing an overlapping area of the view region with respect to the sub-pixel by an area of the sub-pixel.

In an embodiment of the disclosure, the at least one view region may be a view region having a center line overlapping with the sub-pixel in which a length of the center line overlapping with the sub-pixel is equal to or greater than a predetermined value.

According to another embodiment of the disclosure, an electronic device may include: a viewing zone divider; a memory storing at least one instruction; and at least one processor configured to execute the at least one instruction to obtain a plurality of images corresponding to a plurality of views, identify at least one view region overlapping with a sub-pixel from among a plurality of view regions determined to correspond to the plurality of views, based on a characteristic of the viewing zone divider, identify a data value corresponding to the sub-pixel for each of at least one image corresponding to the at least one view region, determine an application degree of the data value for each of the at least one image, based on a level of overlap between the sub-pixel and the at least one view region, and determine an output value of the sub-pixel based on a data value adjusted according to the determined application degree, and output an image based on output values respectively determined for a plurality of sub-pixels including the sub-pixel.

In an embodiment of the disclosure, as the level of overlap between the sub-pixel and the at least one view region increases, the application degree of the data value increases.

In an embodiment of the disclosure, the level of overlap between the sub-pixel and the at least one view region is determined based on an area of overlap between the sub-pixel and the at least one view region.

In an embodiment of the disclosure, as the area of overlap increases, the level of overlap between the sub-pixel and the at least one view region increases.

In an embodiment of the disclosure, the level of overlap between the sub-pixel and the at least one view region may be determined based on a length of overlap between the sub-pixel and a center line of the at least one view region.

In an embodiment of the disclosure, as the length of overlap increases, the level of overlap between the sub-pixel and the at least one view region increases.

In an embodiment of the disclosure, the at least one view region may be a view region whose area overlapping with the sub-pixel is equal to or greater than a predetermined value.

In an embodiment of the disclosure, the at least one view region may be a view region whose value is equal to or greater than a predetermined value, the value being obtained by dividing an overlapping area of the view region with respect to the sub-pixel by an area of the sub-pixel.

In an embodiment of the disclosure, the at least one view region may be a view region having a center line overlapping with the sub-pixel in which a length of the center line overlapping with the sub-pixel is equal to or greater than a predetermined value.

In an embodiment of the disclosure, the viewing zone divider may include a lenticular lens or a parallax barrier.

According to another embodiment of the disclosure, a non-transitory computer-readable recording medium may have recorded thereon a program for executing the method performed by the electronic device.

BRIEF DESCRIPTION OF THE DRAWINGS

The above and other aspects, features, and advantages of certain embodiments of the present disclosure will be more apparent from the following description taken in conjunction with the accompanying drawings.

FIG. 2C illustrates a procedure in which a legacy display device determines an output value of a sub-pixel.

FIG. 5B illustrates a procedure in which an electronic device determines an output value of a sub-pixel, according to an embodiment of the disclosure.

FIG. 6C illustrates a procedure in which an electronic device determines an output value of a sub-pixel, according to an embodiment of the disclosure.

FIG. 7C illustrates a procedure in which an electronic device determines an output value of a sub-pixel, according to an embodiment of the disclosure.

FIG. 8B is a diagram for describing a procedure in which an electronic device determines an output value of a sub-pixel, except for a view region whose area or ratio of overlap with a sub-pixel is equal to or smaller than a predetermined value, according to an embodiment of the disclosure.

FIG. 8C is a diagram for describing a procedure in which an electronic device determines an output value of a sub-pixel, except for a view region whose area or ratio of overlap with a sub-pixel is equal to or smaller than a predetermined value, according to an embodiment of the disclosure.

DETAILED DESCRIPTION

Figure 1:
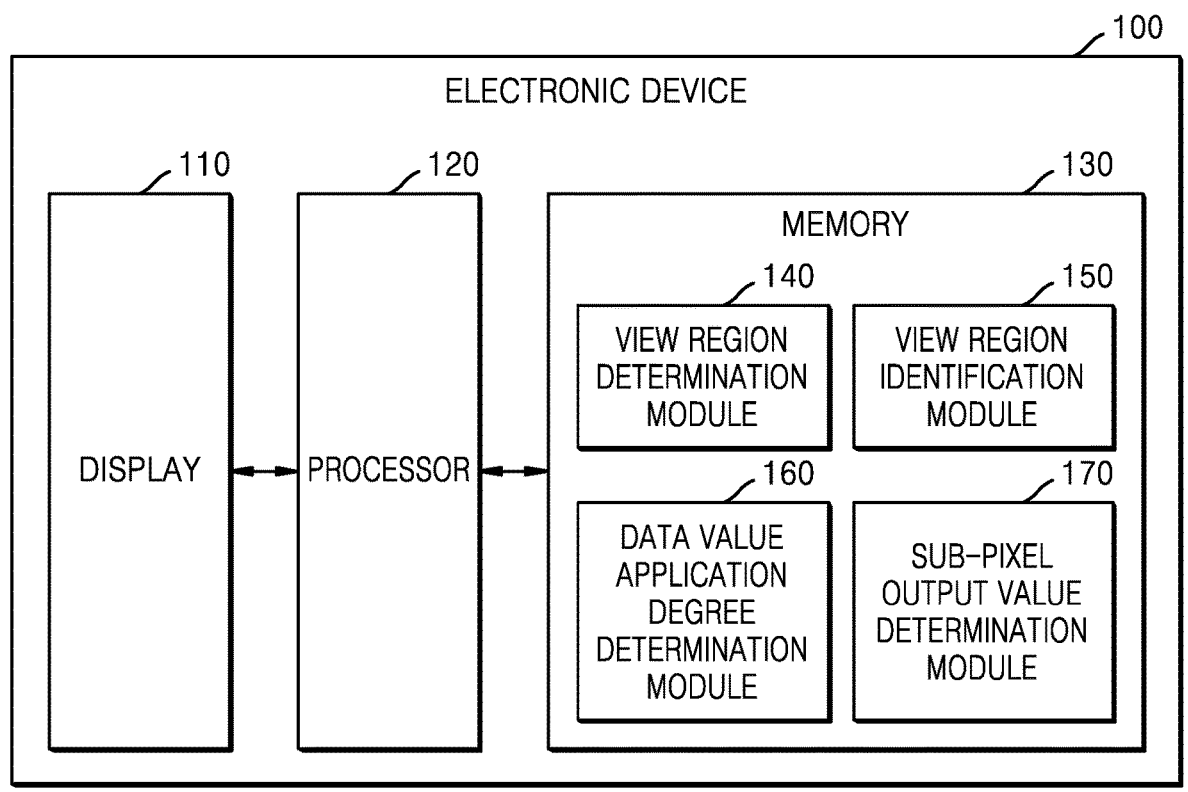
FIG. 1 is a block diagram of an electronic device according to an embodiment of the disclosure.

Throughout the disclosure, the expression "at least one of a, b or c" indicates only a, only b, only c, both a and b, both a and c, both b and c, all of a, b, and c, or variations thereof.

Hereinafter, embodiments of the disclosure will now be described more fully with reference to the accompanying drawings.

In the descriptions of embodiments, certain detailed explanations of the related art which are well known in the art to which the disclosure belongs and are not directly related to the disclosure are omitted. By omitting unnecessary explanations, the essence of the disclosure may not be obscured and may be explicitly conveyed.

For the same reasons, in the drawings, some elements may be exaggerated, omitted, or roughly illustrated. Also, the size of each element does not exactly correspond to an actual size of each element. In the drawings, the same or corresponding elements are denoted by the same reference numerals.

The advantages and features of the disclosure and methods of achieving them will become apparent with reference to embodiments of the disclosure described in detail below with reference to the accompanying drawings. The disclosure may, however, be embodied in many different forms and should not be construed as limited to embodiments set forth herein; rather these embodiments of the disclosure are provided so that this disclosure will be thorough and complete, and will fully convey the scope of the disclosure only defined by the claims to one of ordinary skill in the art. Throughout the specification, like reference numerals denote like elements.

It will be understood that each block of flowchart illustrations, and combinations of blocks in the flowchart illustrations, may be implemented by computer program instructions. The computer program instructions may be provided to a processor of a general-purpose computer, special purpose computer, or other programmable data processing apparatus, such that the instructions, which are executed by the processor of the computer or other programmable data processing apparatus, generate means for performing functions specified in the flowchart block(s). The computer program instructions may also be stored in a computer-executable or computer-readable memory that may direct the computer or other programmable data processing apparatus to function in a particular manner, such that the instructions stored in the computer-executable or computer-readable memory produce an article of manufacture including instruction means that perform the functions specified in the flowchart block(s). The computer program instructions may also be loaded onto the computer or other programmable data processing apparatus to cause a series of operations to be performed on the computer or other programmable apparatus to produce a computer implemented process such that the instructions that are executed on the computer or other programmable apparatus provide operations for implementing the functions specified in the flowchart block(s).

In addition, each block of the flowchart illustrations may represent a module, segment, or portion of code, which includes one or more executable instructions for performing specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

In the disclosure, a machine-readable storage medium may be provided in the form of a non-transitory storage medium. Here, the term 'non-transitory storage medium' may mean that the storage medium is a tangible device and does not include signals (e.g., electromagnetic waves), and may mean that data may be permanently or temporarily stored in the storage medium. For example, the 'non-transitory storage medium' may include a buffer in which data is temporarily stored.

According to an embodiment of the disclosure, the method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)) or may be distributed (e.g., downloaded or uploaded) online through an application store (e.g., Play Store™) or directly between two user apparatuses. In a case of online distribution, at least a portion of the computer program product (e.g., a downloadable application) may be at least temporarily stored or temporarily generated in a machine-readable storage medium such as a manufacturer's server, a server of an application store, or a memory of a relay server.

In the disclosure, a view region may indicate a virtual region corresponding to a view. In the disclosure, an image corresponding to the view may be rendered by one or more sub-pixels overlapping with the virtual view region corresponding to the view.

In the disclosure, a sub-pixel constituting a pixel may refer to a sub-pixel of at least one color component of R, G, and B color components constituting the pixel or may refer to a sub-pixel of at least one color component of Y, U, and V color components constituting the pixel. In the disclosure, sub-pixels at preset positions in a plurality of images may refer to sub-pixels of at least one color component from among R, G, and B color components constituting co-located pixels in the plurality of images or may refer to sub-pixels of at least one color component of Y, U, and V color components constituting co-located pixels. The definition described above is provided assuming a case in which an embodiment of the disclosure conforms to a RGB color format or a YUV color format, and even when the embodiment of the disclosure conforms to a different color format, a sub-pixel may refer to a sub-pixel of at least one color component.

FIG. 1 is a block diagram of an electronic device 100 according to an embodiment of the disclosure.

According to an embodiment of the disclosure, the electronic device 100 may include a display 110, a processor 120, and a memory 130. However, a configuration of the electronic device 100 is not limited to the descriptions above, and thus, may include more elements or fewer elements.

The display 110 may display various contents such as text, images, moving pictures, icons, or signs. According to an embodiment of the disclosure, the display 110 may include, but is not limited to, at least one of a liquid crystal display (LCD), a light-emitting diode (LED) display, an organic light-emitting diode (OLED) display, a quantum dot light-emitting diode (QLED) display, a microelectromechanical systems (MEMS) display, or an electronic paper display.

According to an embodiment of the disclosure, the display 110 may refer to an autostereoscopic display. For example, the display 110 may refer to a display enabled for a user to view different images according to viewing positions by using a viewing zone divider such as a lenticular lens, a parallax barrier, or the like, but the disclosure is not limited thereto.

The processor 120 may execute at least one instruction stored in the memory 130 to control all operations of the electronic device 100.

For example, the processor 120 may obtain a plurality of images corresponding to a plurality of views.

The processor 120 may identify at least one view region overlapping with a sub-pixel, from among a plurality of view regions determined to correspond to the plurality of views.

The processor 120 may identify a data value corresponding to a sub-pixel for each of at least one image corresponding to at least one view region.

The processor 120 may determine an application degree of the data value for each of at least one image, based on a level of overlap between the sub-pixel and the at least one view region, and may determine an output value of the sub-pixel by using a data value adjusted according to the determined application degree.

The processor 120 may output an image by using output values respectively determined for a plurality of sub-pixels including the sub-pixel.

The memory 130 may include a view region determination module 140, a view region identification module 150, a data value application degree determination module 160, and a sub-pixel output value determination module 170.

The view region determination module 140 may store instructions for determining a plurality of view regions respectively corresponding to a plurality of views, based on the number of the plurality of views and a characteristic of the viewing zone divider such as a lenticular lens, a parallax barrier, or the like.

The view region identification module 150 may store instructions for identifying at least one view region overlapping with a sub-pixel from among a plurality of view regions.

The data value application degree determination module 160 may identify a data value corresponding to a sub-pixel for each of at least one image corresponding to at least one view region, and may store instructions for determining an application degree of the data value for each of at least one image, based on a level of overlap between the sub-pixel and the at least one view region.

The sub-pixel output value determination module 170 may store instructions for determining an output value of the sub-pixel by using a data value adjusted according to the determined application degree.

Figure 2A:
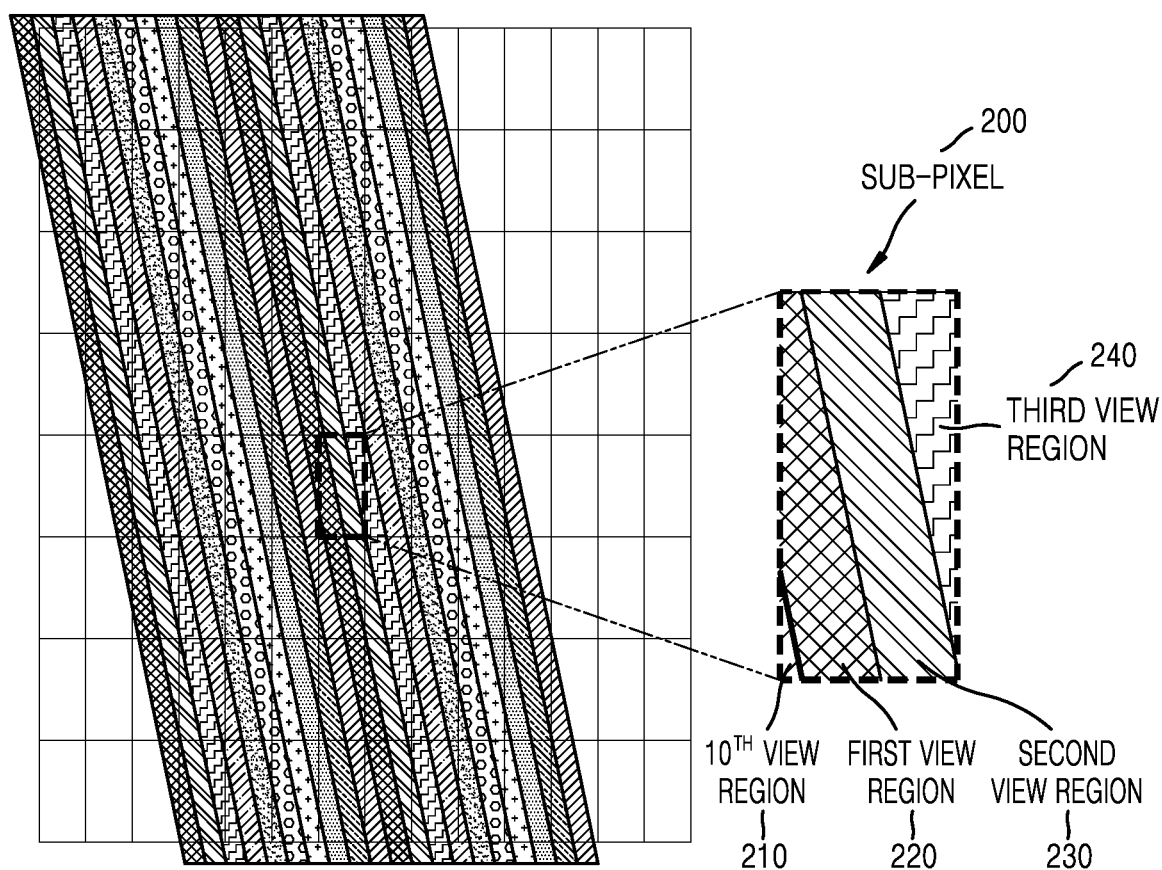
FIG. 2A illustrates a procedure in which a legacy display device determines an output value of a sub-pixel.
Figure 2B:
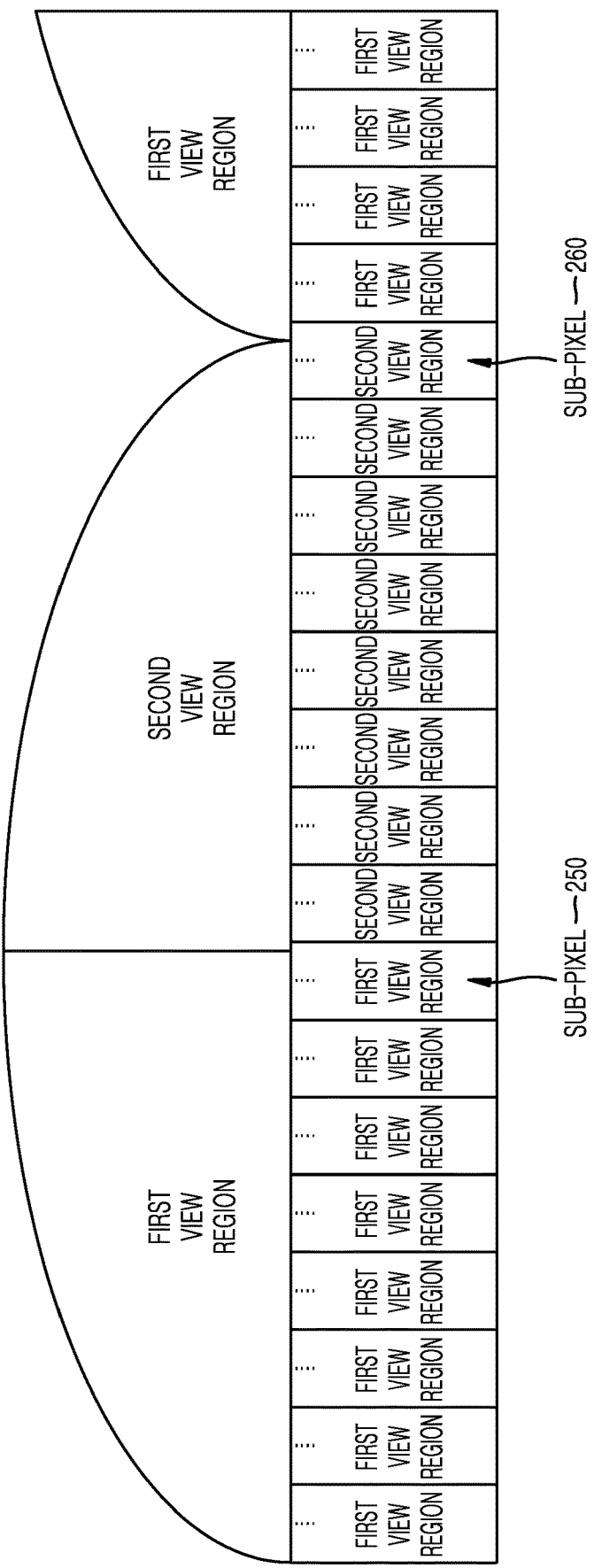
FIG. 2B illustrates a procedure in which a legacy display device determines an output value of a sub-pixel.

FIGS. 2A to 2C are diagrams for describing a procedure in which a legacy display device determines an output value of a sub-pixel.

Referring to FIG. 2A, the legacy display device may identify at least one view region overlapping with a sub-pixel 200, from among a plurality of view regions. For example, the legacy display device may identify, from among 10 view regions, a $10^{th}$ view region 210, a first view region 220, a second view region 230, and a third view regions 240 which overlap with the sub-pixel 200. In this regard, the $10^{th}$ view region 210, the first view region 220, the second view region 230, and the third view region 240 may indicate virtual regions that respectively correspond to a $10^{th}$ view (or a $10^{th}$ image), a first view (or a first image), a second view (or a second image), and a third view (or a third image).

The legacy display device may determine a dominant view region from among the at least one view region overlapping with the sub-pixel 200. For example, the legacy display device may determine, as the dominant view region, the second view region 230 that has a largest overlapping area with respect to the sub-pixel 200 from among the $10^{th}$ view region 210, the first view region 220, the second view region 230, and the third view region 240 which overlap with the sub-pixel 200.

The legacy display device may determine, as an output value of the sub-pixel 200, a data value corresponding to the sub-pixel 200 in an image corresponding to the dominant view. Here, when the sub-pixel 200 is positioned at a first position, a data value corresponding to the sub-pixel 200 may refer to a data value at the first position in an image. For example, the legacy display device may determine, as an output value of the sub-pixel 200, a data value at a first position in a second image corresponding to the second view region 230, by using Equation (1) below.

$$\text{Output} = V_{dominant} \qquad \text{Equation (1)}$$

Where Output refers to an output value of the sub-pixel 200, and $V_{dominant}$ refers to a data value at a first position in an image which corresponds to a dominant view region.

As such, in a case where the legacy display device maps a data value of the image which corresponds to the dominant view region to an output value of the sub-pixel 200, whenever a boundary of a view region does not match a boundary of the sub-pixel 200, an artifact occurs such that a problem in which an image of a low quality is output occurs.

FIG. 2B illustrates a procedure in which the legacy display device determines an output value of a sub-pixel in a stereo-view mode. Here, the number of views in the stereo-view mode may be 2.

Referring to FIG. 2B, the legacy display device may determine, for each sub-pixel, a dominant view region from among at least one view region overlapping with a sub-pixel. For example, the legacy display device may determine, as a dominant view region, a first view region overlapping with a center of a sub-pixel 250 from among the first view region and a second view region which overlap with the sub-pixel 250 at a first position. Alternatively, the legacy display device may determine, as a dominant view region, a second view region overlapping with a center of a sub-pixel 260 from among a first view region and the second view region which overlap with the sub-pixel 260 at a second position.

The legacy display device may determine data values in an image which respectively correspond to dominant view regions, as output values of respective sub-pixels. For example, the legacy display device may determine, as an output value of the sub-pixel 250, a data value at the first location in the first image corresponding to the first view region. Alternatively, the legacy display device may determine, as an output value of the sub-pixel 260, a data value at the second location in the second image corresponding to the second view region.

FIG. 2C illustrates a procedure in which the legacy display device determines an output value of a sub-pixel in a multi-view mode. The number of views in the multi-view mode may be a plural number.

Referring to FIG. 2C, the legacy display device may determine, for each sub-pixel, a dominant view region from among at least one view region overlapping with a sub-pixel. For example, the legacy display device may determine, as a dominant view region, a sixth view region overlapping with a center of a sub-pixel 270 from among the sixth view region and a seventh view region which overlap with the sub-pixel 270 at a third position. Alternatively, the legacy display device may determine, as a dominant view region, a $15^{th}$ view region overlapping with a center of a sub-pixel 280 from among a $14^{th}$ view region, the $15^{th}$ view region, and a $16^{th}$ view region which overlap with the sub-pixel 280 at a fourth position.

The legacy display device may determine data values in images which respectively correspond to dominant view regions, as output values of respective sub-pixels. For example, the legacy display device may determine, as an output value of the sub-pixel 270, a data value at the third location in the sixth image corresponding to the sixth view region. Alternatively, the legacy display device may determine, as an output value of the sub-pixel 280, a data value at the fourth location in the 15$^{th}$ image corresponding to the 15$^{th}$ view region.

Figure 3A:
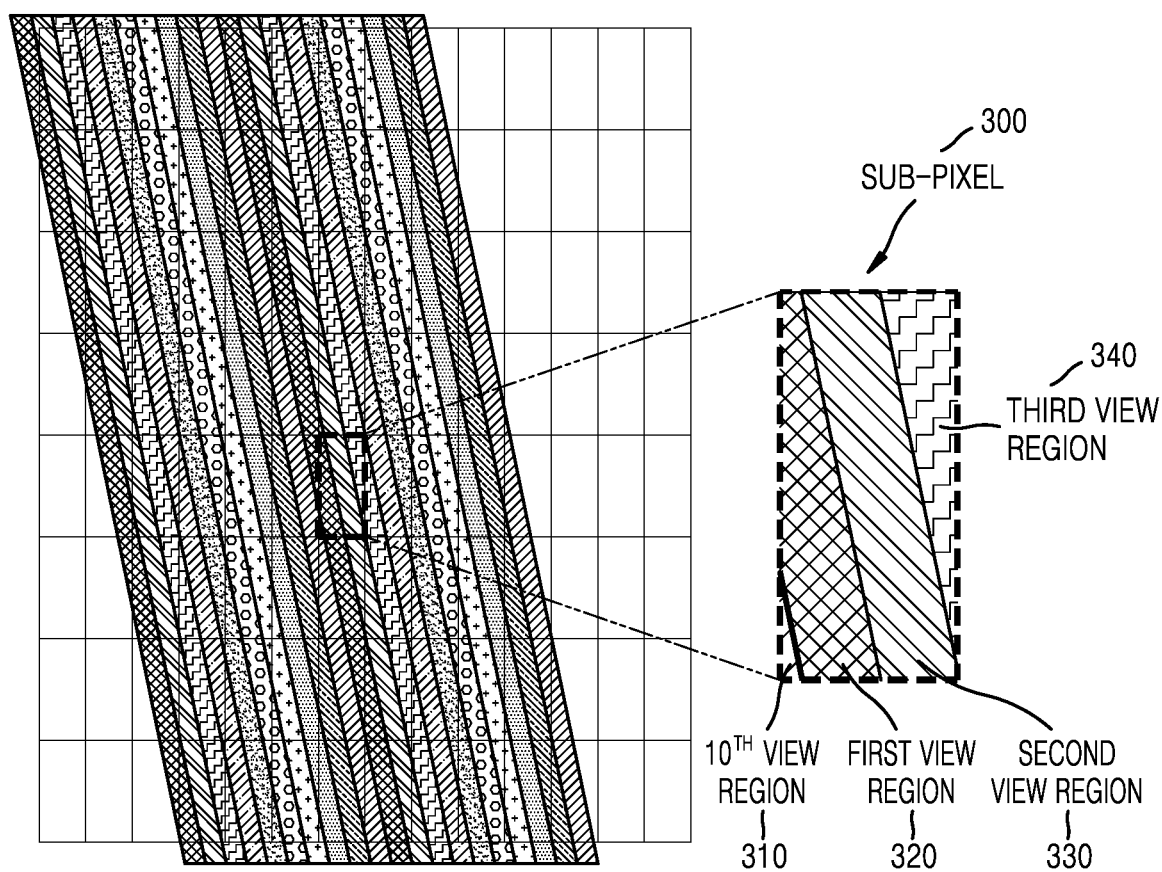
FIG. 3A illustrates a procedure in which a legacy display device determines an output value of a sub-pixel.
Figure 3B:
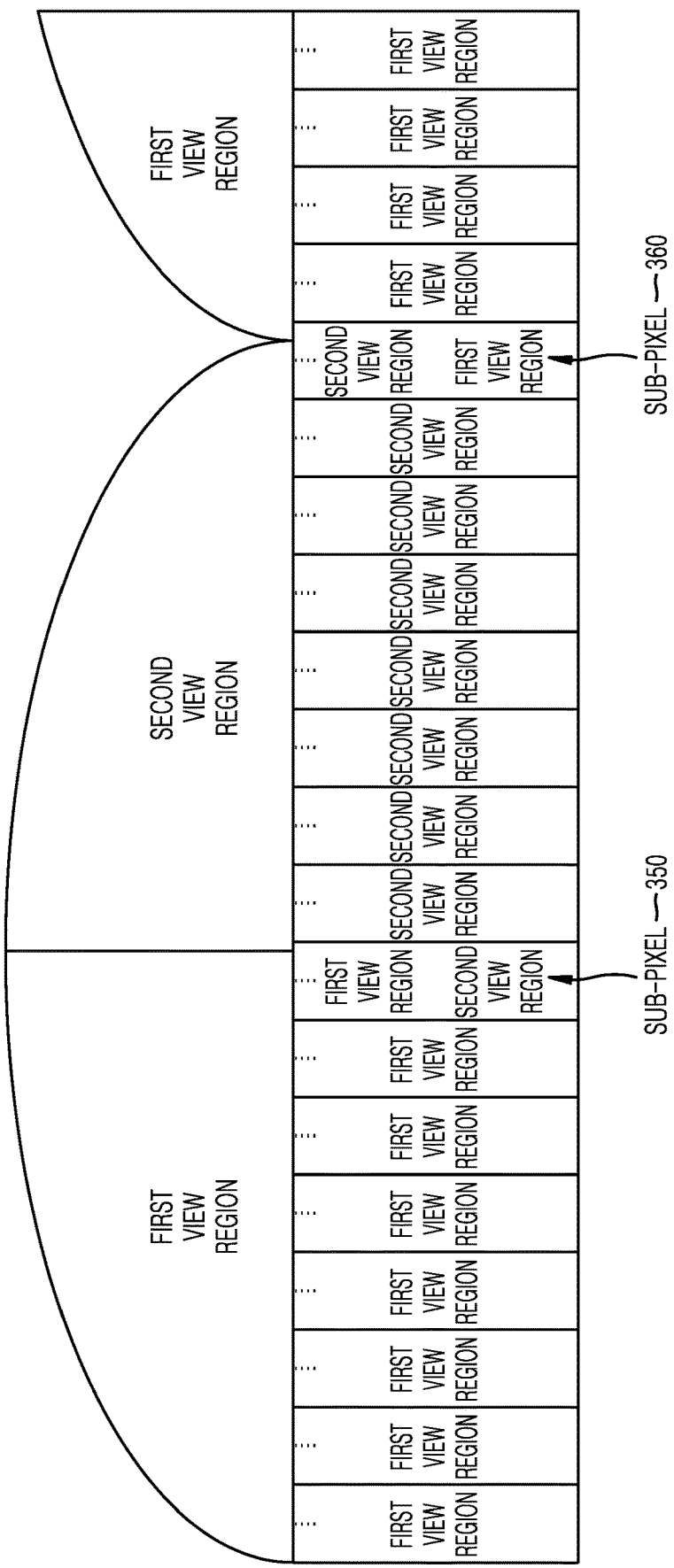
FIG. 3B illustrates a procedure in which a legacy display device determines an output value of a sub-pixel.
Figure 3C:
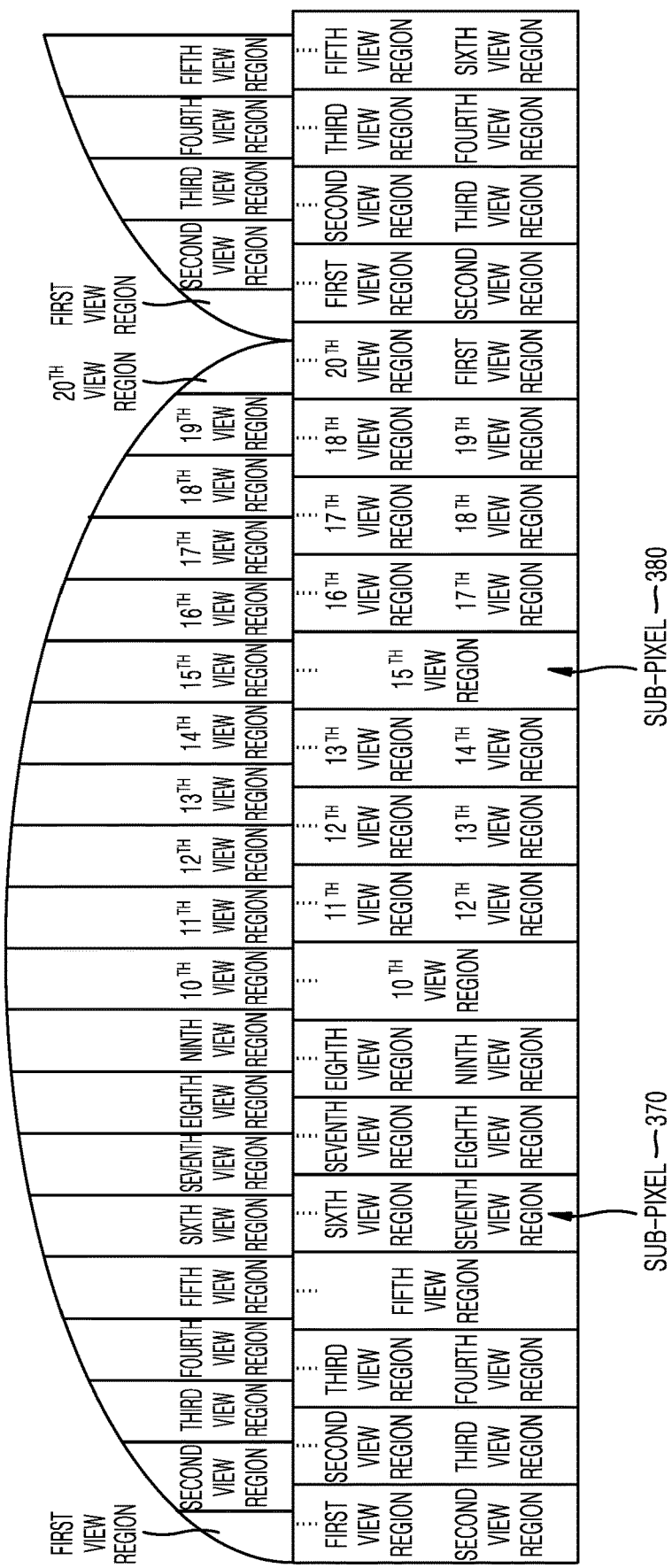
FIG. 3C illustrates a procedure in which a legacy display device determines an output value of a sub-pixel.

FIGS. 3A to 3C are diagrams for describing a procedure in which a legacy display device determines an output value of a sub-pixel.

Referring to FIG. 3A, the legacy display device may identify at least one view region overlapping with a sub-pixel 300, from among a plurality of view regions. For example, the legacy display device may identify, from among 10 view regions, a 10$^{th}$ view region 310, a first view region 320, a second view region 330, and a third view regions 340 which overlap with the sub-pixel 300. In this regard, the 10$^{th}$ view region 310, the first view region 320, the second view region 330, and the third view region 340 may indicate virtual regions that respectively correspond to a 10$^{th}$ view (or a 10$^{th}$ image), a first view (or a first image), a second view (or a second image), and a third view (or a third image).

The legacy display device may determine a dominant view region and a sub-view region from among the at least one view region overlapping with the sub-pixel 300. For example, the legacy display device may determine, as the dominant view region, the second view region 330 that has a largest overlapping area with respect to the sub-pixel 300 from among the 10$^{th}$ view region 310, the first view region 320, the second view region 330, and the third view regions 340 which overlap with the sub-pixel 300. Also, the legacy display device may determine the first view region 320 as the sub-view region, based on a distance to a center of the sub-pixel 300. However, this is merely an embodiment, and the legacy display device may not determine the sub-view region or may determine two or more view regions as the sub-view region.

The legacy display device may determine respective application degrees of data values corresponding to the sub-pixel 300 in images corresponding to the dominant view region and the sub-view region, and may determine an output value of the sub-pixel 300 by using data values adjusted according to the determined application degrees. Here, when the sub-pixel 300 is positioned at a first position, a data value corresponding to the sub-pixel 300 may refer to a data value at the first position in an image. For example, the legacy display device may determine, by using Equation (2) below, the output value of the sub-pixel 300 by adjusting a data value at a first position in a second image and a data value at a first position in a first image, according to the determined application degrees. Here, application degrees of data values in respective images may have a same value or may be determined to be inversely proportional to distances from a center of the sub-pixel 300, but the disclosure is not limited thereto.

$$\text{Output} = \text{weight}_{dominant} * V_{dominant} + \text{weight}_{sub} * V_{sub} \quad \text{Equation (2)}$$

Where, Output refers to an output value of the sub-pixel 300, $V_{dominant}$ refers to a data value at a first position in an image which corresponds to a dominant view region, and $V_{sub}$ refers to a data value at a first position in an image which corresponds to a sub-view region. Also, weight$_{dominant}$ and weight$_{sub}$ respectively refer to application degrees of $V_{dominant}$ and $V_{sub}$. However, when the legacy display device does not determine a sub-view region or determines two or more view regions as a sub-view region, Equation (2) may be changed.

As such, when the legacy display device maps data values of images respectively corresponding to a dominant view region and a sub-view region to an output value of the sub-pixel 300, the legacy display device may output an image showing a smooth change on a boundary of a view region. However, a problem occurs, in which an artifact of a cogwheel shape occurs on a boundary in a particular direction or an artifact of a stripe pattern occurs in a vertical direction to a grain of a lens in a homogeneous region.

FIG. 3B illustrates a procedure in which the legacy display device determines an output value of a sub-pixel in a stereo-view mode. Here, the number of views in the stereo-view mode may be 2.

Referring to FIG. 3B, the legacy display device may determine, for each sub-pixel, a dominant view region and a sub-view region from among at least one view region overlapping with a sub-pixel. For example, the legacy display device may determine, as a dominant view region, a first view region overlapping with a center of a sub-pixel 350 from among the first view region and a second view region which overlap with the sub-pixel 350 at a first position, and may determine the second view region as a sub-view region. Alternatively, the legacy display device may determine, as a dominant view region, a second view region overlapping with a center of a sub-pixel 360 from among a first view region and the second view region which overlap with the sub-pixel 360 at a second position, and may determine the first view region as a sub-view region.

The legacy display device may adjust each of data values in images corresponding to the dominant view region and the sub-view region, according to an application degree, and thus, may determine an output value of a sub-pixel. For example, the legacy display device may determine an output value of the sub-pixel 350 by respectively adjusting data values at first positions in a first image and a second image, according to an application degree. Alternatively, the legacy display device may determine an output value of the sub-pixel 360 by respectively adjusting data values at second positions in the first image and the second image, according to the application degree.

FIG. 3C illustrates a procedure in which the legacy display device determines an output value of a sub-pixel in a multi-view mode. The number of views in the multi-view mode may be a plural number.

Referring to FIG. 3C, the legacy display device may determine, for each sub-pixel, a dominant view region and a sub-view region from among at least one view region overlapping with a sub-pixel. For example, the legacy display device may determine, as a dominant view region, a sixth view region overlapping with a center of a sub-pixel 370 from among the sixth view region and a seventh view region which overlap with the sub-pixel 370 at a third position, and may determine the seventh view region as a sub-view region. Alternatively, the legacy display device may determine, as a dominant view region, a 15$^{th}$ view region overlapping with a center of a sub-pixel 380 from among a 14$^{th}$ view region, the 15$^{th}$ view region, and a 16% view region which overlap with the sub-pixel 380 at a fourth position. The legacy display device may not determine a sub-view region, based on an area overlapping among the sub-pixel 380 and the 14$^{th}$ view region and the 15$^{th}$ view region.

The legacy display device may adjust each of data values in images corresponding to the dominant view region and the sub-view region, according to an application degree, and thus, may determine an output value of a sub-pixel. For example, the legacy display device may determine an output value of the sub-pixel 370 by respectively adjusting data values at third positions in a sixth image and a seventh image, according to an application degree. Alternatively, the legacy display device may determine a data value at a fourth position in a 15$^{th}$ image, as an output value of the sub-pixel 380.

Figure 4A:
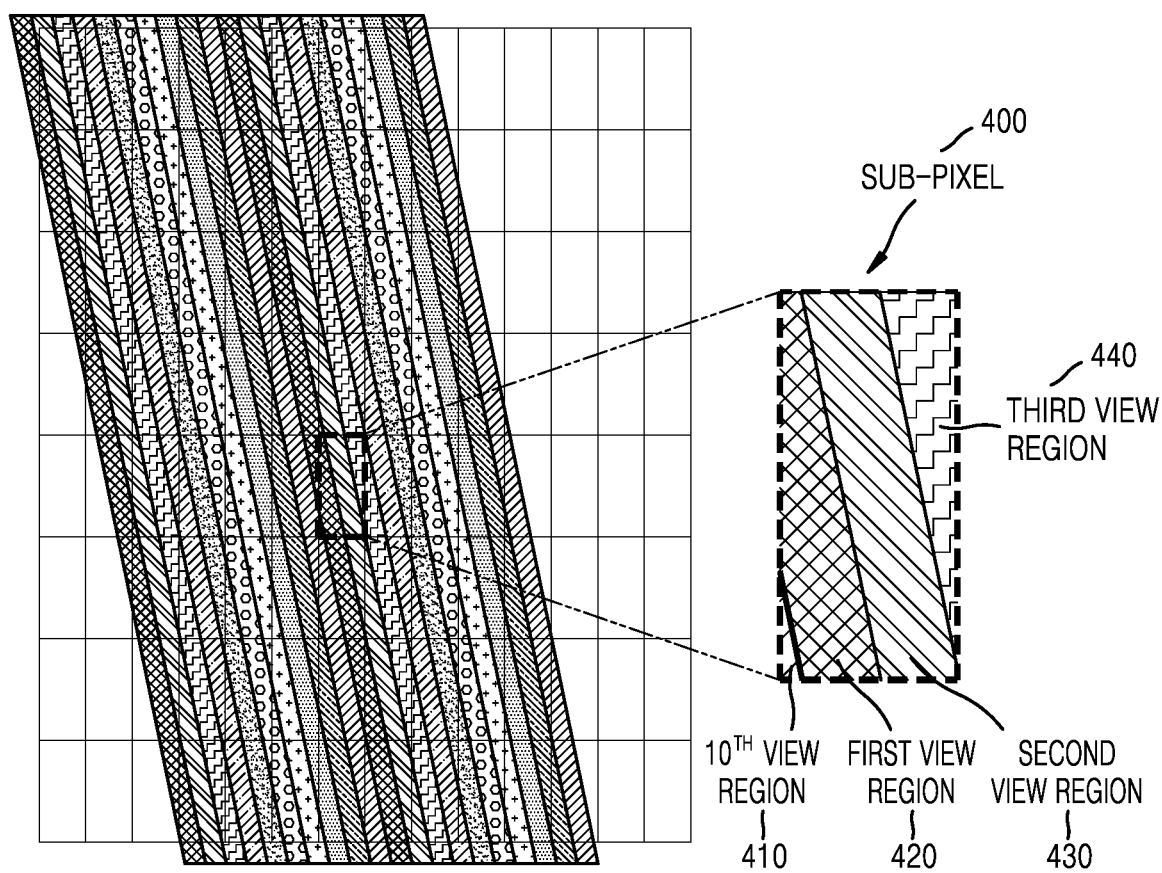
FIG. 4A illustrates a procedure in which an electronic device determines an output value of a sub-pixel, according to an embodiment of the disclosure.
Figure 4B:
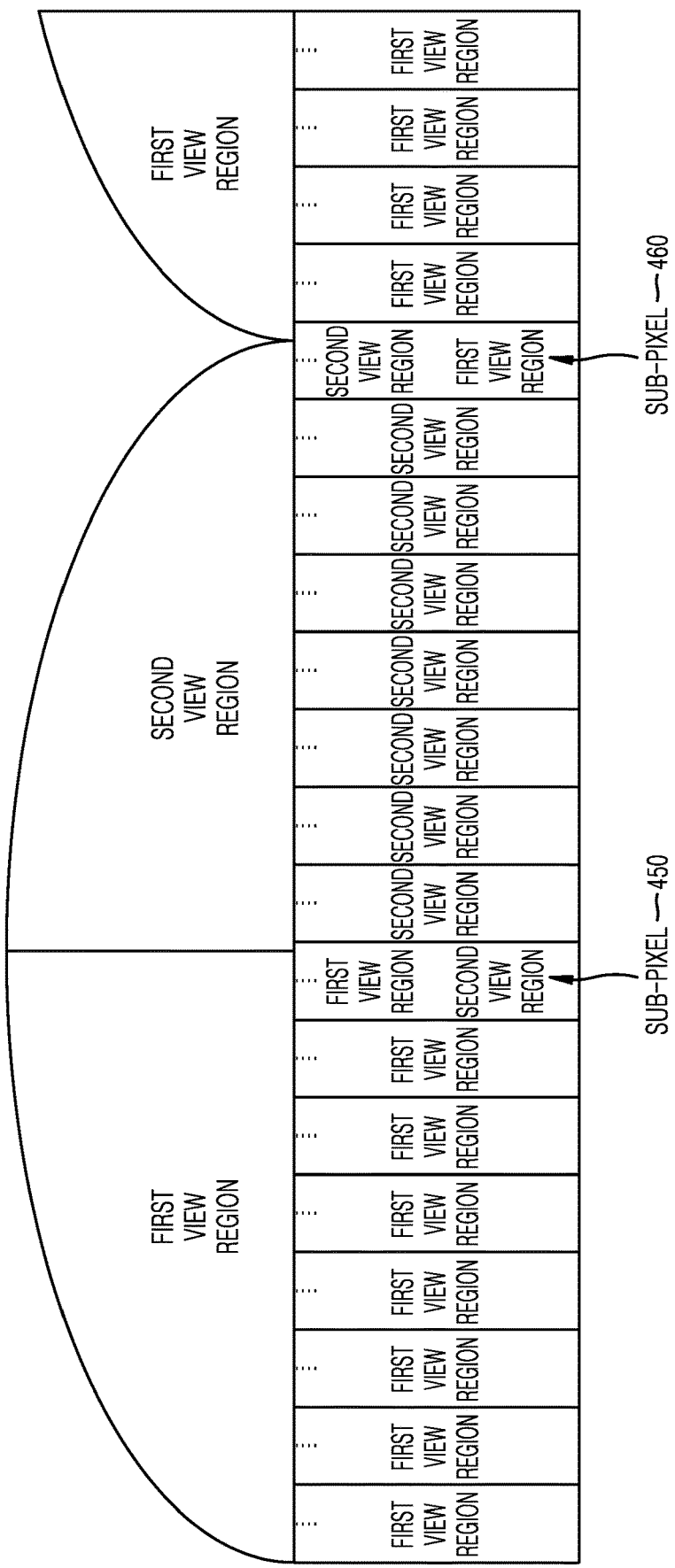
FIG. 4B illustrates a procedure in which an electronic device determines an output value of a sub-pixel, according to an embodiment of the disclosure.
Figure 4C:
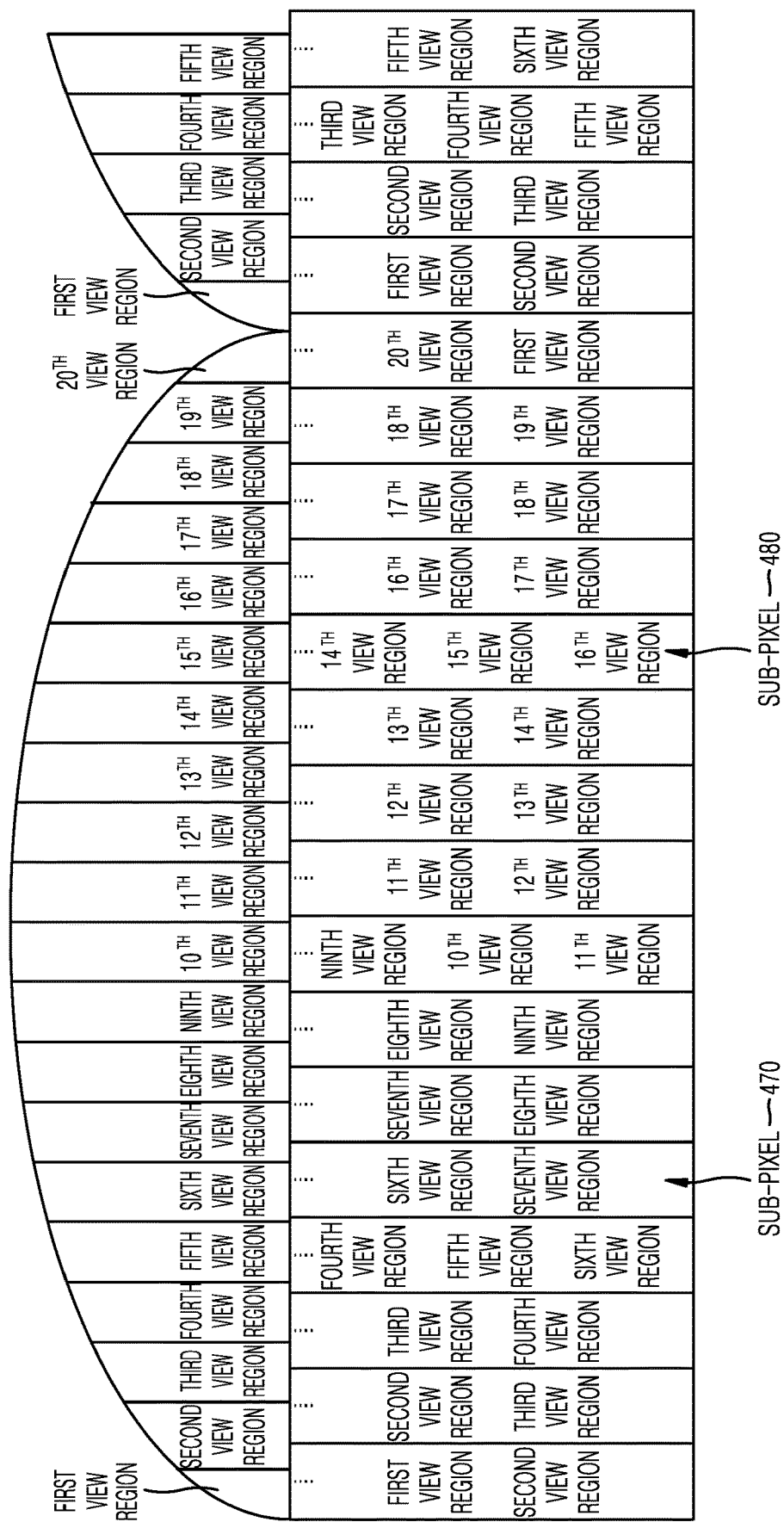
FIG. 4C illustrates a procedure in which an electronic device determines an output value of a sub-pixel, according to an embodiment of the disclosure.

FIGS. 4A to 4C are diagrams for describing a procedure in which the electronic device 100 determines an output value of a sub-pixel, according to an embodiment of the disclosure.

Referring to FIG. 4A, according to an embodiment of the disclosure, the electronic device 100 may identify at least one view region overlapping with a sub-pixel 400, from among a plurality of view regions. For example, the electronic device 100 may identify, from among 10 view regions, a 10$^{th}$ view region 410, a first view region 420, a second view region 430, and a third view region 440 which overlap with the sub-pixel 400. In this regard, the 10$^{th}$ view region 410, the first view region 420, the second view region 430, and the third view region 440 may indicate virtual regions that respectively correspond to a 10$^{th}$ view (or a 10$^{th}$ image), a first view (or a first image), a second view (or a second image), and a third view (or a third image).

According to an embodiment of the disclosure, the electronic device 100 may identify a data value corresponding to a sub-pixel for each of at least one image corresponding to at least one view region. Here, when the sub-pixel 400 is positioned at a first position, a data value corresponding to the sub-pixel 400 may refer to a data value at the first position in an image. For example, the electronic device 100 may identify a data value at a first position for each of the 10$^{th}$ view region 410, the first view region 420, the second view region 430, and the third view region 440. That is, the electronic device 100 may identify each of a data value at a first position in the 10$^{th}$ image, a data value at a first position in the first image, a data value at a first position in the second image, and a data value at a first position in the third image.

According to an embodiment of the disclosure, the electronic device 100 may determine, for each of the at least one image, an application degree of a data value corresponding to the sub-pixel 400, based on a level of overlap between the sub-pixel 400 and the at least one view region. Here, the application degree of the data value may indicate a weight to be applied to the data value. For example, the electronic device 100 may determine application degrees of data values at first positions respectively for the 10$^{th}$ image, the first image, the second image, and the third image, based on levels of overlap between the sub-pixel 400 and each of the 10$^{th}$ view region 410, the first view region 420, the second view region 430, and the third view region 440.

According to an embodiment of the disclosure, the electronic device 100 may determine a level of overlap between the sub-pixel 400 and at least one view region, based on an area in which the sub-pixel 400 and the at least one view region overlap with each other. For example, the electronic device 100 may determine levels of overlap between the sub-pixel 400 and each of the 10$^{th}$ view region 410, the first view region 420, the second view region 430, and the third view region 440, based on areas in which the sub-pixel 400 and each of the 10$^{th}$ view region 410, the first view region 420, the second view region 430, and the third view region 440 overlap. This will be described below with reference to FIGS. 5A to 5C.

According to an embodiment of the disclosure, the electronic device 100 may determine a level of overlap between the sub-pixel 400 and at least one view region, based on a length of overlap between the sub-pixel 400 and a center line of the at least one view region. For example, the electronic device 100 may determine levels of overlap between the sub-pixel 400 and each of the 10$^{th}$, view region 410, the first view region 420, the second view region 430, and the third view region 440, based on lengths of overlap between the sub-pixel 400 and each of center lines of the 10$^{th}$ view region 410, the first view region 420, the second view region 430, and the third view region 440. This will be described below with reference to FIGS. 6A to 6C.

According to an embodiment of the disclosure, the electronic device 100 may determine levels of overlap between the sub-pixel 400 and each of the 10$^{th}$ view region 410, the first view region 420, the second view region 430, and the third view region 440, based on a distance between a center of the sub-pixel 400 and the at least one view region comprising the 10$^{th}$ view region 410, the first view region 420, the second view region 430, and the third view region 440. For example, the electronic device 100 may determine levels of overlap between the sub-pixel 400 and each of the 10$^{th}$ view region 410, the first view region 420, the second view region 430, and the third view region 440, based on distances between the center of the sub-pixel 400 and each of the 10$^{th}$ view region 410, the first view region 420, the second view region 430, and the third view region 440. This will be described below with reference to FIGS. 7A to 7C.

According to an embodiment of the disclosure, the electronic device 100 may determine an output value of the sub-pixel 400 by using a data value adjusted according to the determined application degree for the at least one view region. For example, the electronic device 100 may determine, by using Equation (3) below, the output value of the sub-pixel 400 by adjusting each of the data values at the first positions in the 10th image, the first image, the second image, and the third image, according to the determined application degrees.

$$\text{Output} = \text{weight}_1 * V_1 + \text{weight}_2 * V_2 + \ldots + \text{weight}_n * V_n \quad \text{Equation (3)}$$

Where, Output refers to the output value of the sub-pixel 400, $V_1, V_2, \ldots, V_n$ refer to data values at first positions in images respectively corresponding to view regions, and weight$_1$, weight$_2$, ..., weight$_n$ refer to respective application degrees.

Compared with FIGS. 2A and 3A, the electronic device 100 determines the output value of the sub-pixel 400 by considering all view regions overlapping with the sub-pixel 400, and thus, effectively reduces an artifact, such that a technical effect of improving a quality of an output image may be obtained. The more the number of views is, the lower a pixel-per-inch (PPI) is, or the smaller a slant angle of a lenticular lens is, the more view regions are overlapped in a sub-pixel, and thus, the technical effect may increase. This will be described below with reference to FIGS. 9A to 11B.

The electronic device 100 may determine a weight, except for some view regions of a plurality of view regions overlapping with the sub-pixel 400, based on a predetermined rule. For example, the electronic device 100 may determine the weight, except for a view region whose overlapping area is smaller than a predetermined value, the view region being of the at least one view region overlapping with the sub-pixel 400. This will be described below with reference to FIGS. 8A to 8C.

FIG. 4B illustrates a procedure in which the electronic device 100 determines an output value of a sub-pixel in a stereo-view mode, according to an embodiment of the disclosure. Here, the number of views in the stereo-view mode may be 2.

According to an embodiment of the disclosure, the electronic device 100 may identify, for each sub-pixel, at least one view region overlapping with a sub-pixel. For example, the electronic device 100 may identify a first view region and a second view region which overlap with a sub-pixel 450 at a first position. Alternatively, the electronic device 100 may identify a first view region and a second view region which overlap with a sub-pixel 460 at a second position.

According to an embodiment of the disclosure, the electronic device 100 may identify a data value corresponding to a sub-pixel for each of at least one image corresponding to at least one view region. For example, the electronic device 100 may identify respective data values at first positions in a first image and a second image. Alternatively, the electronic device 100 may identify respective data values at second positions in the first image and the second image.

According to an embodiment of the disclosure, the electronic device 100 may determine, for each of at least one image, an application degree of a data value corresponding to a sub-pixel, based on levels of overlap between each of sub-pixels and at least one view region. For example, the electronic device 100 may determine an application degree of the data value at the first position in the first image and an application degree of the data value at the first position in the second image, based on levels of overlap between the sub-pixel 450 and each of the first view region and the second view region. Alternatively, the electronic device 100 may determine an application degree of the data value at the second position in the first image and an application degree of the data value at the second position in the second image, based on levels of overlap between the sub-pixel 460 and each of the first view region and the second view region.

According to an embodiment of the disclosure, the electronic device 100 may determine an output value of a sub-pixel by respectively adjusting data values according to determined application degrees for at least one image. For example, the electronic device 100 may determine an output value of the sub-pixel 450 by respectively adjusting the data values at the first positions in the first image and the second image, according to the determined application degrees. Alternatively, the electronic device 100 may determine an output value of the sub-pixel 460 by respectively adjusting the data values at the second positions in the first image and the second image, according to the determined application degrees.

FIG. 4C illustrates a procedure in which the electronic device 100 determines an output value of a sub-pixel in a multi-view mode, according to an embodiment of the disclosure. The number of views in the multi-view mode may be a plural number.

According to an embodiment of the disclosure, the electronic device 100 may identify, for each sub-pixel, at least one view region overlapping with a sub-pixel. For example, the electronic device 100 may identify a sixth view region and a seventh view region which overlap with a sub-pixel 470 at a third position. Alternatively, the electronic device 100 may identify a $14^{th}$ view region, a $15^{th}$ view region, and a $16^{th}$ view region which overlap with a sub-pixel 480 at a fourth position.

According to an embodiment of the disclosure, the electronic device 100 may identify a data value corresponding to a sub-pixel for each of at least one image corresponding to at least one view region. For example, the electronic device 100 may identify respective data values at third positions in a sixth image and a seventh image. Alternatively, the electronic device 100 may identify respective data values at fourth positions in a $14^{th}$ image, a $15^{th}$ image, and a $16^{th}$ image.

According to an embodiment of the disclosure, the electronic device 100 may determine, for each of at least one image, an application degree of a data value corresponding to a sub-pixel, based on levels of overlap between each of sub-pixels and at least one view region. For example, the electronic device 100 may determine an application degree of the data value at the third position in the sixth image and an application degree of the data value at the third position in the seventh image, based on levels of overlap between the sub-pixel 470 and each of the sixth view region and the seventh view region. Alternatively, the electronic device 100 may determine application degrees of the data values at the fourth positions in the $14^{th}$ image, the $15^{th}$ image, and the $16^{th}$ image, based on levels of overlap between the sub-pixel 480 and each of the $14^{th}$ view region, the $15^{th}$ view region, and the $16^{th}$ view region.

According to an embodiment of the disclosure, the electronic device 100 may determine an output value of a sub-pixel by respectively adjusting data values according to determined application degrees for at least one image. For example, the electronic device 100 may determine an output value of the sub-pixel 470 by respectively adjusting the data values at the third positions in the sixth image and the seventh image, according to the determined application degrees. Alternatively, the electronic device 100 may determine an output value of the sub-pixel 480 by respectively adjusting the data values at the fourth positions in the $14^{th}$ image, the $15^{th}$ image, and the $16^{th}$ image, according to the determined application degrees.

Figure 5A:
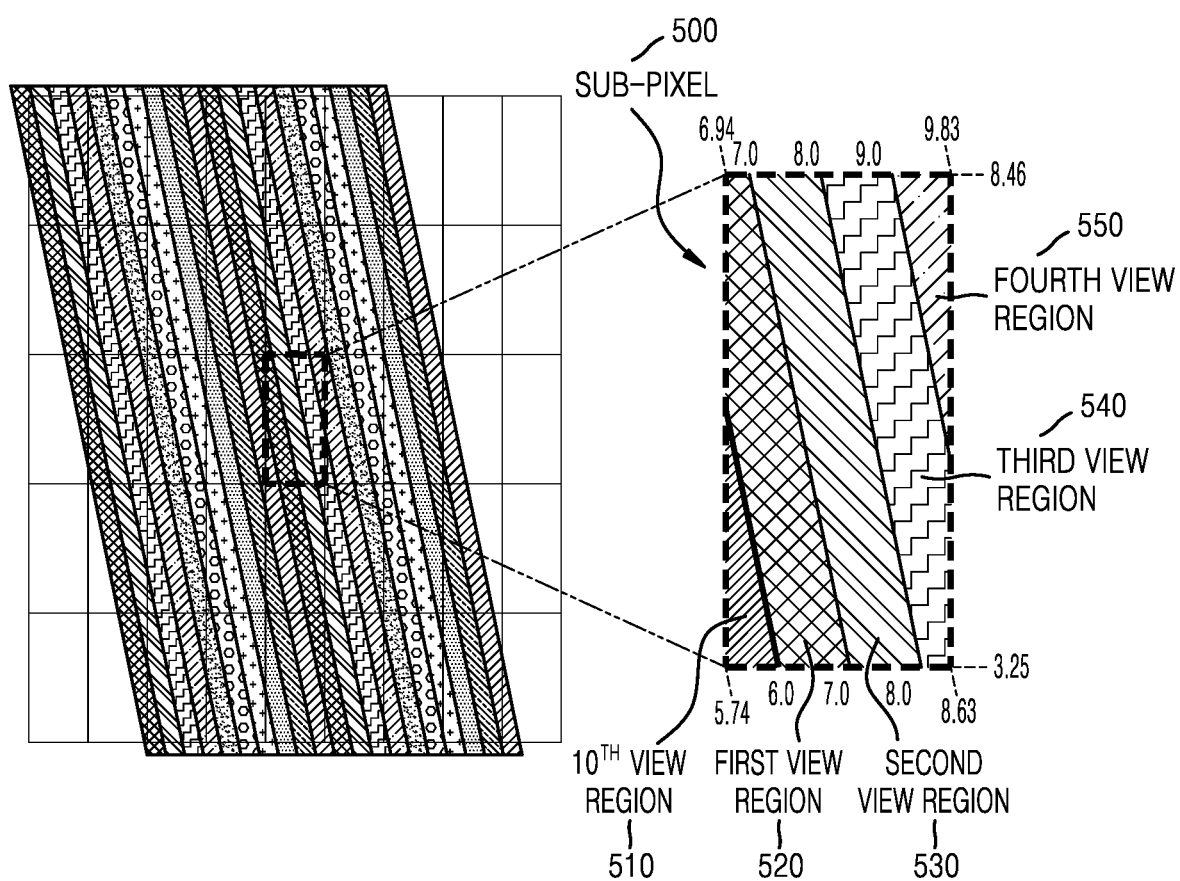
FIG. 5A illustrates a procedure in which an electronic device determines an output value of a sub-pixel, according to an embodiment of the disclosure.

FIGS. 5A and 5B are diagrams for describing a procedure in which the electronic device 100 determines an output value of a sub-pixel, according to an embodiment of the disclosure.

Referring to FIG. 5A, according to an embodiment of the disclosure, the electronic device 100 may identify at least one view region overlapping with a sub-pixel 500 at a first position, from among a plurality of view regions. For example, the electronic device 100 may identify, from among 10 view regions, a $10^{th}$ view region 510, a first view region 520, a second view region 530, a third view region 540, and a fourth view region 550 which overlap with the sub-pixel 500. In this regard, the $10^{th}$ view region 510, the first view region 520, the second view region 530, the third view region 540, and the fourth view region 550 may indicate virtual regions that respectively correspond to a $10^{th}$ view (or a $10^{th}$ image), a first view (or a first image), a second view (or a second image), a third view (or a third image), and a fourth view (or a fourth image).

According to an embodiment of the disclosure, the electronic device 100 may identify a data value corresponding to the sub-pixel 500 for each of at least one image corresponding to at least one view region. For example, the electronic device 100 may identify respective data values at first positions in the $10^{th}$ image, the first image, the second image, the third image, and the fourth image.

According to an embodiment of the disclosure, the electronic device 100 may determine, for each of the at least one image, an application degree of a data value corresponding to the sub-pixel 500, based on a level of overlap between the sub-pixel 500 and the at least one view region. Here, the electronic device 100 may determine a level of overlap between the sub-pixel 500 and at least one view region, based on an area in which the sub-pixel 500 and the at least one view region overlap with each other.

Referring to FIG. 5B, according to an embodiment of the disclosure, the electronic device 100 may identify areas where the sub-pixel 500 and each of at least one view region overlap, and may determine application degrees of data values at first positions in the at least one view region, based on the identification. A second column 560 of FIG. 5B shows areas where each of view regions and the sub-pixel 500 overlap, and a third column 570 shows application degrees of data values at first positions in respective images.

According to an embodiment of the disclosure, the electronic device 100 may identify areas where the sub-pixel 500 and each of at least one view region overlap, assuming that view regions respectively have parallelogrammic shapes with a same horizontal length. For example, the electronic device 100 may identify, by using Equations (4) to (9) below, areas where the sub-pixel 500 and each of the $10^{th}$ view region 510, the first view region 520, the second view region 530, the third view region 540, and the fourth view region 550 overlap.

$$\tan \alpha = \frac{8.46 - 3.25}{6.94 - 5.74} = \frac{5.21}{1.2} \quad \text{Equation (4)}$$

$$S_{10} = \frac{1}{2} * (6.0 - 5.74)^2 * \tan \alpha = 0.146748 \quad \text{Equation (5)}$$

$$S_1 = 5.21 * (7 - 6) - \frac{1}{2} * (6.94 - 6)^2 * \tan \alpha = 3.29185 \quad \text{Equation (6)}$$

$$S_2 = 5.21 * (8 - 7) = 5.21 \quad \text{Equation (7)}$$

$$S_3 = 5.21 * (9 - 8) - \frac{1}{2} * (9 - 8.63)^2 * \tan \alpha = 4.91281 \quad \text{Equation (8)}$$

$$S_4 = \frac{1}{2} * (9.83 - 9) * \tan \alpha = 1.49549 \quad \text{Equation (9)}$$

Where, $\alpha$ refers to a slant angle of a lenticular lens, and $S_{10}$, $S_1$, $S_2$, $S_3$ and $S_4$ refer to the areas where the sub-pixel 500 and each of the $10^{th}$ view region 510, the first view region 520, the second view region 530, the third view region 540, and the fourth view region 550 overlap.

Here, a coordinate value of the top of the sub-pixel 500 and a coordinate value of the bottom of the sub-pixel 500 may be set to have a difference according to the slant angle $\alpha$. That is, a coordinate value of the top of the sub-pixel 500 and a coordinate value of the bottom the sub-pixel 500 where a straight line having a slant of tan a meet may have a same value. Accordingly, four corners of the sub-pixel 500 may respectively have coordinate values of (5.74, 3.25), (8.63, 3.25), (6.94, 8.46), and (9.83, 8.46). However, coordinate axis values of the sub-pixel 500 are merely an embodiment, and may vary according to a coordinate axis value setting method, a unit, and the like, such that values of $S_{10}$, $S_1$, $S_2$, $S_3$, and $S_4$ may vary.

According to an embodiment of the disclosure, the electronic device 100 may determine, for each of at least one image, an application degree of a data value at a first position, based on areas where the sub-pixel 500 and each of at least one view region overlap. For example, the electronic device 100 may determine application degrees of the respective data values at the first positions in the $10^{th}$ image, the first image, the second image, the third image, and the fourth image by dividing the areas where the sub-pixel 500 and each of the $10^{th}$ view region 510, the first view region 520, the second view region 530, the third view region 540, and the fourth view region 550 overlap by an area of the sub-pixel 500 (=15.0569=5.21*2.89). That is, as an area where the sub-pixel 500 and a view region overlap increase, a level of overlap between the sub-pixel 500 and the view region may increase, such that an application degree of a data value in an image may increase. However, this is merely an embodiment, and a method by which the electronic device 100 determines an application degree of a data value, based on an overlapping area, is not limited to the aforedescribed embodiment of the disclosure.

According to an embodiment of the disclosure, the electronic device 100 may determine an output value of the sub-pixel 500 by adjusting each data value in each of at least one image, according to a determined application degree. For example, the electronic device 100 may determine, by using Equation (10) below, an output value of the sub-pixel 500 by respectively adjusting data values at the first positions in the $10^{th}$ image, the first image, the second image, the third image, and the fourth image, according to determined application degrees.

$$\text{Output} = \text{weight}_{10} * V_{10} + \text{weight}_1 * V_1 + \ldots + \text{weight}_4 * V_4 = 0.009746 * V_{10} + 0.218627 * V_1 + \ldots + 0.099322 * V_4 \quad \text{Equation (10)}$$

Where, Output refers to the output value of the sub-pixel 500, and $V_{10}$, $V_1$, $\ldots$, $V_4$ refer to data values at first positions in images respectively corresponding to view regions.

Figure 6A:
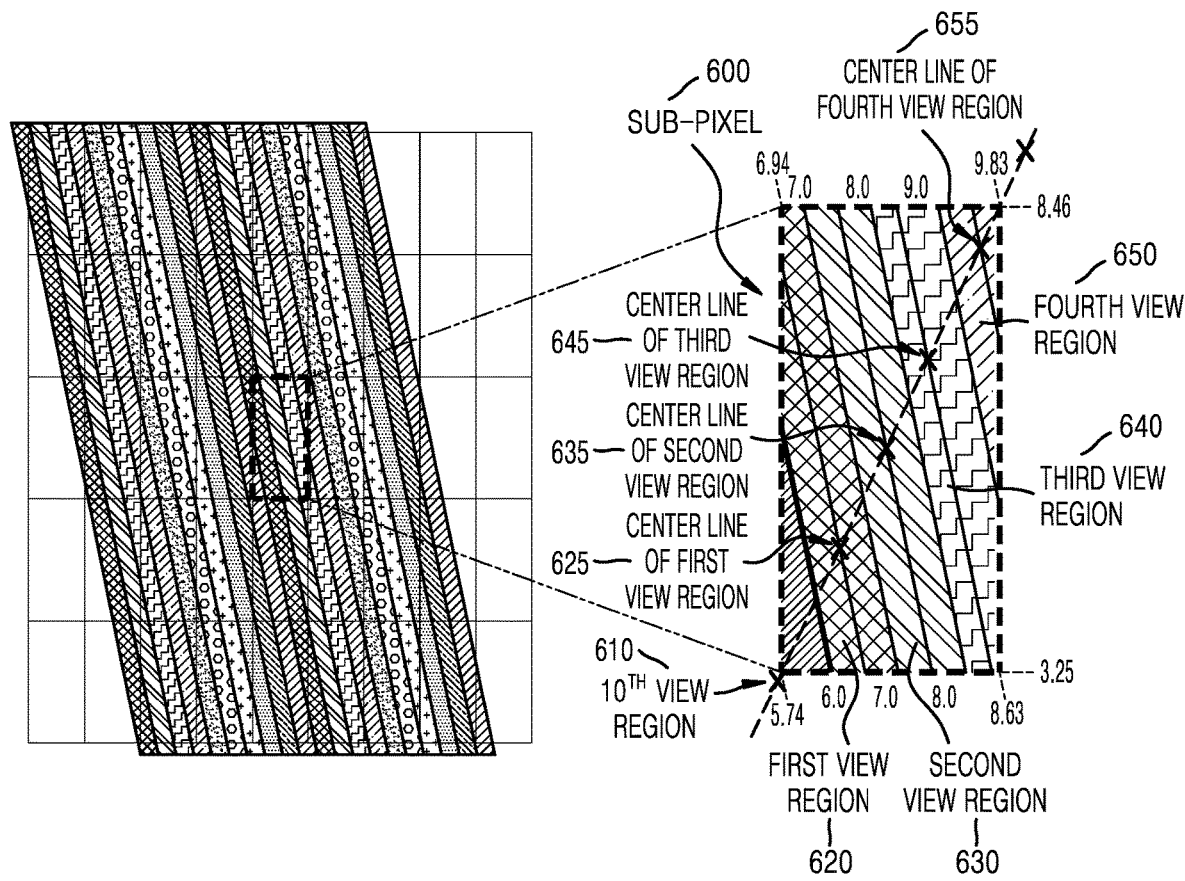
FIG. 6A illustrates a procedure in which an electronic device determines an output value of a sub-pixel, according to an embodiment of the disclosure.
Figure 6B:
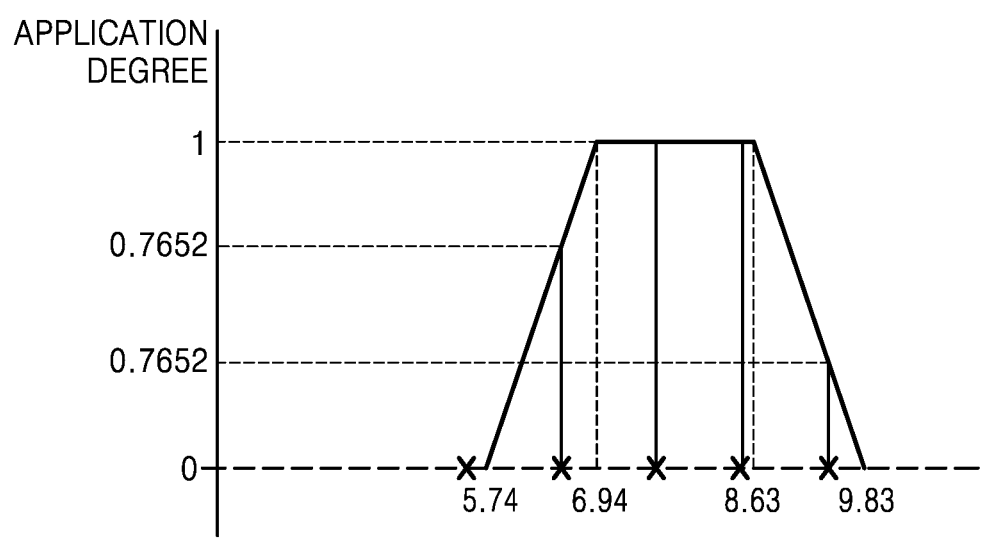
FIG. 6B illustrates a procedure in which an electronic device determines an output value of a sub-pixel, according to an embodiment of the disclosure.

FIGS. 6A to 6C are diagrams for describing a procedure in which the electronic device 100 determines an output value of a sub-pixel, according to an embodiment of the disclosure. Redundant operations compared with FIGS. 5A and 5B are briefly described or not described.

Referring to FIG. 6A, according to an embodiment of the disclosure, the electronic device 100 may identify at least one view region overlapping with a sub-pixel 600 at a first position, from among a plurality of view regions. For example, the electronic device 100 may identify, from among 10 view regions, a $10^{th}$ view region 610, a first view region 620, a second view region 630, a third view region 640, and a fourth view region 650 which overlap with the sub-pixel 600. In this regard, the $10^{th}$ view region 610, the first view region 620, the second view region 630, the third view region 640, and the fourth view region 650 may indicate virtual regions that respectively correspond to a $10^{th}$ view (or a $10^{th}$ image), a first view (or a first image), a second view (or a second image), a third view (or a third image), and a fourth view (or a fourth image).

According to an embodiment of the disclosure, the electronic device 100 may identify a data value corresponding to the sub-pixel 600 for each of at least one image corresponding to at least one view region. For example, the electronic device 100 may identify respective data values at first positions in the $10^{th}$ image, the first image, the second image, the third image, and the fourth image.

According to an embodiment of the disclosure, the electronic device 100 may determine, for each of the at least one image, an application degree of a data value corresponding to the sub-pixel 600, based on a level of overlap between the sub-pixel 600 and the at least one view region. Here, the electronic device 100 may determine a level of overlap between the sub-pixel 600 and at least one view region, based on a length of overlap between the sub-pixel 600 and a center line of the at least one view region.

According to an embodiment of the disclosure, the electronic device 100 may identify a coordinate value of a center line of each of at least one view region, assuming that view regions respectively have parallelogrammic shapes with a same horizontal length. For example, the electronic device 100 may identify, as a coordinate value of a center line 625 of a first view region, 6.5 that is a coordinate value of a point at which a diagonal line connecting the bottom left corner of the sub-pixel 600 and the top right corner of the sub-pixel 600 meets the center line 625 of the first view region. Equally, the electronic device 100 may identify respective coordinate values of a center line 635 of a second view region, a center line 645 of a third view region, and a center line 655 of a fourth view region as 7.5, 8.5, and 9.5. A center line of a $10^{th}$ view region 610 is positioned outside the sub-pixel 600 but may have a coordinate value of 5.5. However, this is merely an embodiment, and the electronic device 100 may identify respective coordinate values of center lines of view regions, in a different manner.

Referring to FIG. 6B, according to an embodiment of the disclosure, the electronic device 100 may determine application degrees of data values to be proportional to respective lengths of overlap between the sub-pixel 600 and each of view regions. For example, when a length of a center line of a view region overlapping with the sub-pixel 600 is the maximum, the electronic device 100 may map an application degree value of 1 to the view region. That is, an application degree value of 1 may be mapped to a view region whose center line has a coordinate value between about 6.94 and about 8.63. Also, when a center line of a view region does not overlap with the sub-pixel 600, the electronic device 100 may map an application degree value of 0 to the view region. That is, an application degree value of 0 may be mapped to a view region whose center line has a coordinate value equal to or smaller than 5.74 or a coordinate value equal to or greater than 9.83. Accordingly, even when a view region includes an area overlapping with the sub-pixel 600, when a center line of the view region does not overlap with the sub-pixel 600, an application degree value of 0 may be mapped. In a case where a length of a center line of a view region overlapping with the sub-pixel 600 has a value equal to or smaller than a maximum value, the electronic device 100 may map an application degree being proportional to an overlapping length to the view region. That is, an application degree being proportional to a length of an overlapping center line may be mapped to the view region whose center line has a coordinate value between about 5.74 and about 6.94 or between about 8.63 and about 9.83.

Referring to FIG. 6C, according to an embodiment of the disclosure, the electronic device 100 may determine application degrees of data values of respective images, based on coordinate values of center lines of respective view regions. A second column 660 of FIG. 6C shows coordinate values of center lines of respective view regions, a third column 670 shows application degrees of data values at first positions in respective images, and a fourth column 680 shows normalized values of the application degrees of the third column 670.

According to an embodiment of the disclosure, the electronic device 100 may respectively map application degrees to view regions, based on coordinate values of center lines of the view regions. For example, the electronic device 100 may map an application degree value of 1 to the second view region 630 and the third view region 640 whose center lines have coordinate values between about 6.94 and about 8.63. Also, the electronic device 100 may map an application degree value of 0 to the $10^{th}$ view region 610 whose center line has a coordinate value equal to or smaller than 5.74. The electronic device 100 may map an application degree being proportional to a length of an overlapping center line to the first view region 620 and the fourth view region 650 whose center lines have coordinate values between about 5.74 and about 6.94 or between about 8.63 and about 9.83. Accordingly, an application degree value of 0.7652 may be mapped to the first view region 620, and an application degree value of 0.3472 may be mapped to the fourth view region 650. However, this is merely an embodiment, and a method by which the electronic device 100 determines an application degree, based on a length of an overlapping center line, is not limited to the afore-described embodiment of the disclosure.

According to an embodiment of the disclosure, the electronic device 100 may normalize application degrees to allow a sum of determined application degrees to be 1. The electronic device 100 may determine an output value of the sub-pixel 600 by adjusting each data value in each of at least one image, according to a normalized application degree. For example, the electronic device 100 may determine, by using Equation (11) below, an output value of the sub-pixel 600 by respectively adjusting data values at the first positions in the first image, the second image, the third image, and the fourth image, according to the normalized application degrees.

$$\text{Output}=\text{weight}_1*V_1+\text{weight}_2*V_2+\text{weight}_3*V_3+\text{weight}_4*V_4=0.2459*V_1+0.3213*V_2+0.3213*V_3+0.1116*V_4 \quad \text{Equation(11)}$$

Where, Output refers to the output value of the sub-pixel 600, and $V_1$, $V_2$, $V_3$, and $V_4$ refer to data values at first positions in images respectively corresponding to view regions.

Compared with the embodiment of FIGS. 5A and 5B, the electronic device 100 may determine an application degree of a data value based on a length of a center line overlapping with the sub-pixel 600, thereby reducing a computation amount required to calculate an area of a view region overlapping with the sub-pixel 600.

Figure 7A:
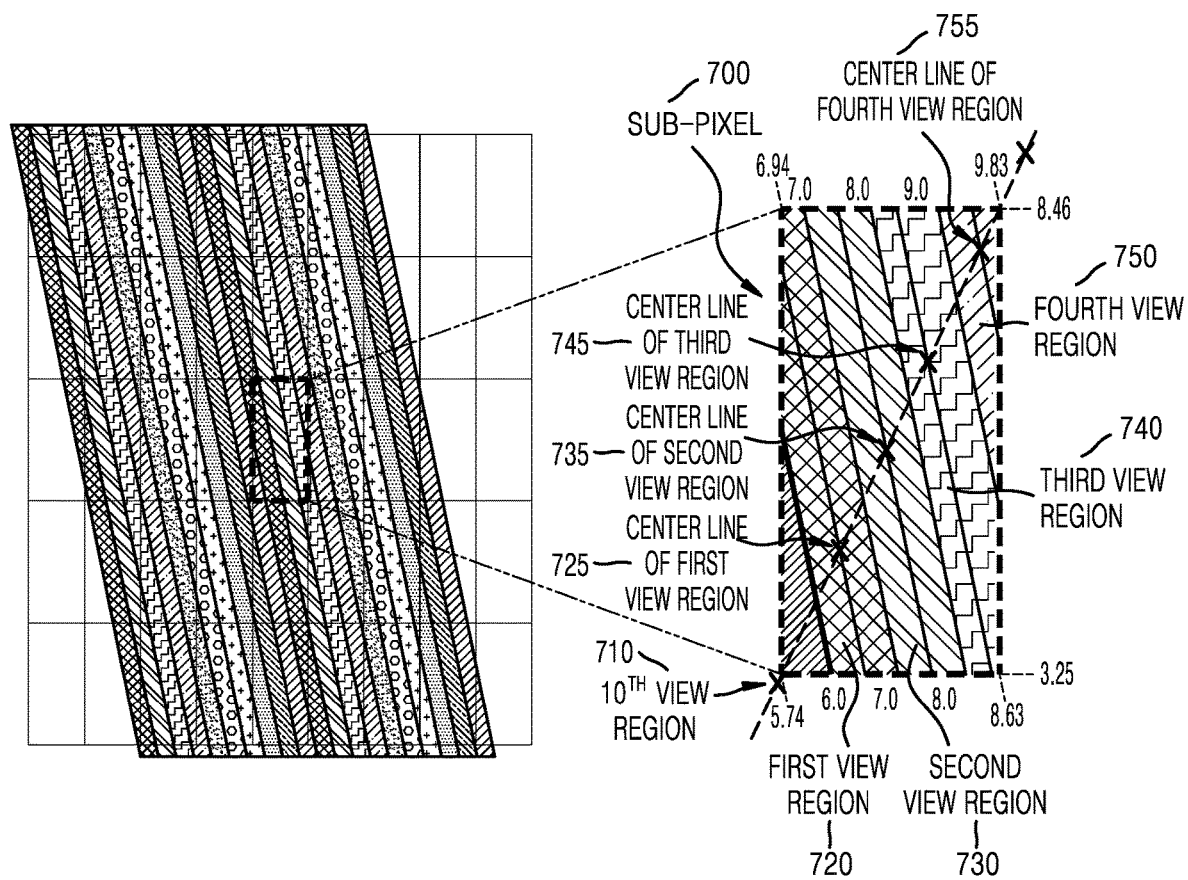
FIG. 7A illustrates a procedure in which an electronic device determines an output value of a sub-pixel, according to an embodiment of the disclosure.
Figure 7B:
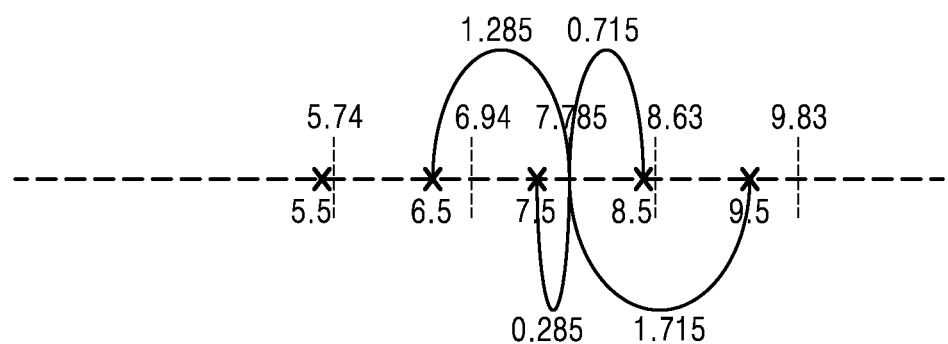
FIG. 7B illustrates a procedure in which an electronic device determines an output value of a sub-pixel, according to an embodiment of the disclosure.

FIGS. 7A to 7C are diagrams for describing a procedure in which the electronic device 100 determines an output value of a sub-pixel, according to an embodiment of the disclosure. Redundant operations compared with FIGS. 6A to 6C are briefly described or not described.

Referring to FIG. 7A, according to an embodiment of the disclosure, the electronic device 100 may identify at least one view region overlapping with a sub-pixel 700 at a first position, from among a plurality of view regions. For example, the electronic device 100 may identify, from among 10 view regions, a $10^{th}$ view region 710, a first view region 720, a second view region 730, a third view region 740, and a fourth view region 750 which overlap with the sub-pixel 700. In this regard, the $10^{th}$ view region 710, the first view region 720, the second view region 730, the third view region 740, and the fourth view region 750 may indicate virtual regions that respectively correspond to a $10^{th}$ view (or a $10^{th}$ image), a first view (or a first image), a second view (or a second image), a third view (or a third image), and a fourth view (or a fourth image).

According to an embodiment of the disclosure, the electronic device 100 may identify a data value corresponding to the sub-pixel 700 for each of at least one image corresponding to at least one view region. For example, the electronic device 100 may identify respective data values at first positions in the $10^{th}$ image, the first image, the second image, the third image, and the fourth image.

According to an embodiment of the disclosure, the electronic device 100 may determine, for each of the at least one image, an application degree of a data value corresponding to the sub-pixel 700, based on a level of overlap between the sub-pixel 700 and the at least one view region. Here, the electronic device 100 may determine a level of overlap between the sub-pixel 700 and at least one view region, based on a distance between a center line of the at least one view region and a center of the sub-pixel 700.

Referring to FIG. 7B, according to an embodiment of the disclosure, the electronic device 100 may identify a coordinate value of the center of the sub-pixel 700. For example, the electronic device 100 may identify, as the coordinate value of the center of the sub-pixel 700, 7.785 that is a median value between a coordinate value (5.74) of the bottom left corner of the sub-pixel 700 and a coordinate value (9.83) of the top right corner of the sub-pixel 700. Alternatively, the electronic device 100 may identify, as the coordinate value of the center of the sub-pixel 700, 7.785 that is a median value between a coordinate value (6.94) of the top left corner of the sub-pixel 700 and a coordinate value (8.63) of the bottom right corner of the sub-pixel 700. However, this is merely an embodiment, and the electronic device 100 may identify the coordinate value of the center of the sub-pixel 700 in a different manner.

According to an embodiment of the disclosure, the electronic device 100 may identify a distance between the center of the sub-pixel 700 and a center line of each of at least one view region. For example, the electronic device 100 may identify, as a distance between a center line 725 of a first view region and a center of the sub-pixel 700, 1.285 that is a difference value between a coordinate value 6.5 of the center line 725 of the first view region and a coordinate value 7.785 of the center of the sub-pixel 700. Equally, the electronic device 100 may identify 0.285, 0.715, and 1.715 as respective distances between the center of the sub-pixel 700 and each of a center line 735 of the second view region, a center line 745 of the third view region, and a center line 755 of the fourth view region. However, this is merely an embodiment, the electronic device 100 may identify distances between the center of the sub-pixel 700 and each of center lines of view regions, in a different manner.

Referring to FIG. 7C, the electronic device 100 may determine application degrees of data values of respective image, based on the distances between the center of the sub-pixel 700 and each of the center lines of view regions. A second column 760 of FIG. 7C shows coordinate values of the center lines of respective view regions, and a third column 770 shows the distances between the center of the sub-pixel 700 and each of the center lines of the view regions. A fourth column 780 of FIG. 7C shows application degrees of data values at first positions in respective images, and a fifth column 790 shows normalized values of the application degrees of the fourth column 780.

According to an embodiment of the disclosure, the electronic device 100 may map reciprocal numbers of the distances between the center of the sub-pixel 700 and each of the center lines of the view regions to the application degrees of the data values in respective images. For example, the electronic device 100 may determine, as an application degree of a data value in a first image, 0.77821 that is a reciprocal number of 1.285 being a distance between the center line 725 of the first view region and the center of the sub-pixel 700. Equally, the electronic device 100 may determine 3.50877, 1.3986, and 0.58309 as application degrees of respective data values in the second image, the third image, and the fourth image. However, this is merely an embodiment, and a method by which the electronic device 100 determines an application degree of a data value based on a distance between a view region and the center of the sub-pixel 700 is not limited to the aforedescribed embodiment of the disclosure.

According to an embodiment of the disclosure, the electronic device 100 may normalize application degrees to allow a sum of determined application degrees to be 1. The electronic device 100 may determine an output value of the sub-pixel 700 by adjusting each data value in each of at least one image, according to a normalized application degree. For example, the electronic device 100 may determine, by using Equation (12) below, an output value of the sub-pixel 700 by respectively adjusting data values at the first positions in the first image, the second image, the third image, and the fourth image, according to the normalized application degrees.

$$\text{Output}=\text{weight}_1*V_1+\text{weight}_2*V_2+\text{weight}_3*V_3+\text{weight}_4*V_4=0.124143*V_1+0.559731*V_2+0.22311*V_3+0.093017*V_4 \quad \text{Equation (12)}$$

Where, Output refers to the output value of the sub-pixel 700, and $V_1$, $V_2$, $V_3$, and $V_4$ refer to data values at first positions in images respectively corresponding to view regions.

Figure 8A:
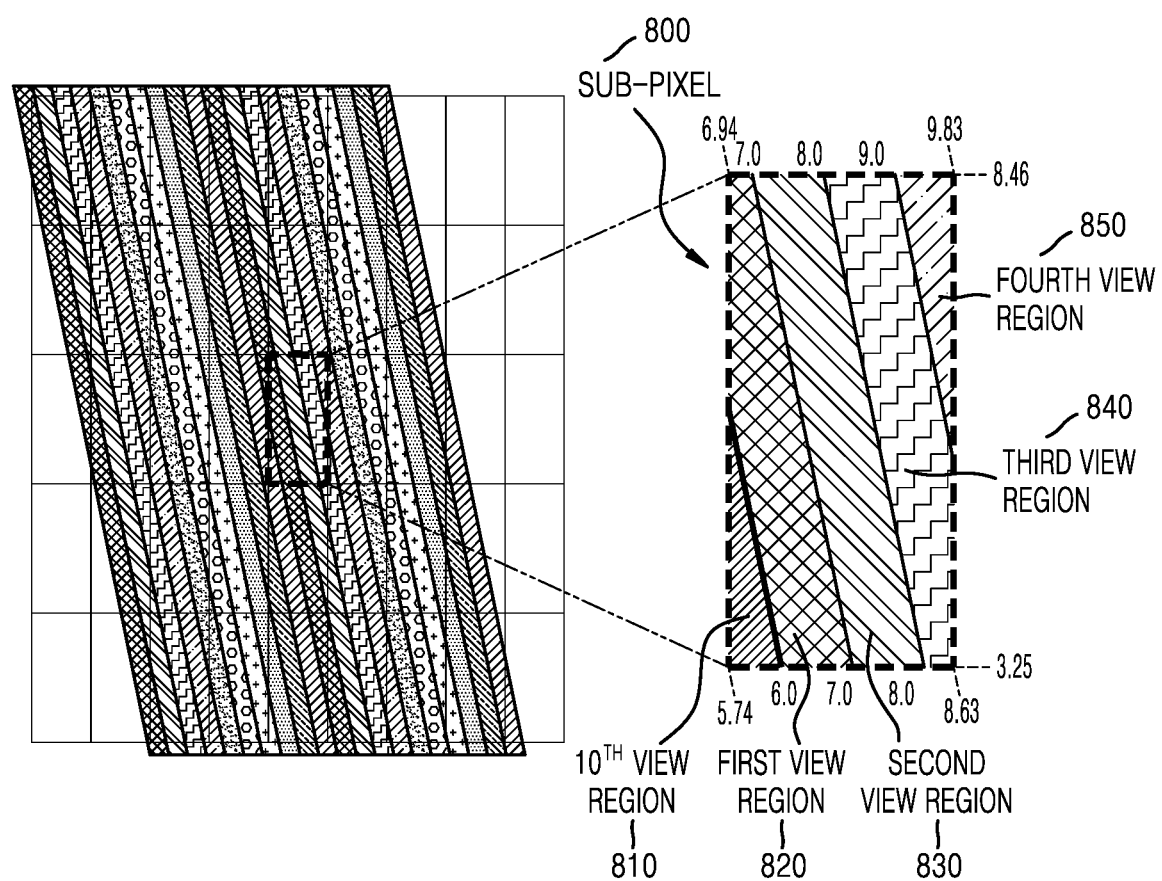
FIG. 8A is a diagram for describing a procedure in which an electronic device determines an output value of a sub-pixel, except for a view region whose area or ratio of overlap with a sub-pixel is equal to or smaller than a predetermined value, according to an embodiment of the disclosure.

FIGS. 8A to 8C are diagrams for describing a procedure in which the electronic device 100 determines an output value of a sub-pixel, except for a view region whose area or ratio of overlap with the sub-pixel is equal to or smaller than a predetermined value, according to an embodiment of the disclosure. Redundant operations compared with FIGS. 5A and 5B are briefly described or not described.

Referring to FIG. 8A, according to an embodiment of the disclosure, the electronic device 100 may identify at least one view region overlapping with a sub-pixel 800 at a first position, from among a plurality of view regions. For example, the electronic device 100 may identify, from among 10 view regions, a $10^{th}$ view region 810, a first view region 820, a second view region 830, a third view region 840, and a fourth view region 850 which overlap with the sub-pixel 800. In this regard, the $10^{th}$ view region 810, the first view region 820, the second view region 830, the third view region 840, and the fourth view region 850 may indicate virtual regions that respectively correspond to a $10^{th}$ view (or a $10^{th}$ image), a first view (or a first image), a second view (or a second image), a third view (or a third image), and a fourth view (or a fourth image).

According to an embodiment of the disclosure, the electronic device 100 may identify a data value corresponding to the sub-pixel 800 for each of at least one image corresponding to at least one view region. For example, the electronic device 100 may identify respective data values at first positions in the $10^{th}$ image, the first image, the second image, the third image, and the fourth image.

According to an embodiment of the disclosure, the electronic device 100 may determine, for each of the at least one image, an application degree of a data value corresponding to the sub-pixel 800, based on a level of overlap between the sub-pixel 800 and the at least one view region. Here, the electronic device 100 may determine a level of overlap between the sub-pixel 800 and at least one view region, based on an area of overlap between the sub-pixel 800 and the at least one view region.

According to an embodiment of the disclosure, the electronic device 100 may determine, based on a predetermined rule, application degrees of data values, except for some view regions from among the at least one view region overlapping with the sub-pixel 800. For example, the electronic device 100 may determine the application degrees of the data values, except for a view region whose area overlapping with the sub-pixel 800 is equal to or smaller than a predetermined value. Alternatively, the electronic device 100 may determine the application degrees of the data values, except for a view region whose value is equal to or smaller than a predetermined value, the value being obtained by dividing an overlapping area of the view region with respect to the sub-pixel 800 by an area of the sub-pixel 800. However, this is merely an embodiment, and the predetermined rule is not limited to the above descriptions.

Referring to FIG. 8B, according to an embodiment of the disclosure, the electronic device 100 may determine an application degree of a data value only for a view region whose area overlapping with the sub-pixel 800 is equal to or greater than a predetermined value. A second column 860 of FIG. 8B shows areas where the sub-pixel 800 and respective view regions overlap, a third column 865 shows areas whose overlaps are equal to or greater than a predetermined value, and a fourth column 870 shows application degrees of data values at first positions in respective images.

According to an embodiment of the disclosure, the electronic device 100 may exclude a view region whose area overlapping with the sub-pixel 800 is smaller than the predetermined value. For example, when the predetermined value is 1, the electronic device 100 may exclude the $10^{th}$ view region 810 whose area overlapping with the sub-pixel 800 is 0.146748. However, the predetermined value is merely an embodiment, and alternatively, the predetermined value may be predefined, or may be changed in response to a user input.

According to an embodiment of the disclosure, the electronic device 100 may determine application degrees of data values at first positions in respective images, with respect to view regions whose areas overlapping with the sub-pixel 800 are equal to or greater than the predetermined value. For example, the electronic device 100 may divide areas where each of the first view region 820, the second view region 830, the third view region 840, and the fourth view region 850 overlaps with the sub-pixel 800 by a value (=14.9102=15.0569−0.146748) obtained by subtracting an area of overlap between the $10^{th}$ view region 810 and the sub-pixel 800 from an area of the sub-pixel 800, thereby determining application degrees of data values at first positions in the first image, the second image, the third image, and the fourth image.

According to an embodiment of the disclosure, the electronic device 100 may determine an output value of the sub-pixel 800 by adjusting each data value in each of at least one image, according to a determined application degree. For example, the electronic device 100 may determine, by using Equation (13) below, the output value of the sub-pixel 800 by respectively adjusting the data values at the first positions in the first image, the second image, the third image, and the fourth image, according to the determined application degrees.

$$\text{Output}=\text{weight}_1 * V_1 + \text{weight}_2 * V_2 + \text{weight}_3 * V_3 + \text{weight}_4 * V_4 = 0.220778 * V_1 + 0.349425 * V_2 + 0.329493 * V_3 + 0.1003 * V_4 \quad \text{Equation (13)}$$

Where, Output refers to the output value of the sub-pixel 800, and $V_1$, $V_2$, $V_3$, and $V_4$ refer to data values at first positions in images respectively corresponding to view regions.

Referring to FIG. 8C, according to an embodiment of the disclosure, the electronic device 100 may determine an application degree of a data value only for a view region whose value obtained by dividing an area of the view region overlapping with the sub-pixel 800 by the area of the sub-pixel 800 is equal to or greater than a predetermined value. A second column 880 shows areas where the sub-pixel 800 and respective view regions overlap, and a third column 885 shows values or area ratios which are obtained by dividing areas where respective view regions and the sub-pixel 800 overlap by the area of the sub-pixel 800. A fourth column 890 shows area ratios being equal to or greater than a predetermined value, and a fifth column 895 shows application degrees of data values at first positions in respective images.

According to an embodiment of the disclosure, the electronic device 100 may exclude a view region whose value or area ratio obtained by dividing an area of the view region overlapping with the sub-pixel 800 by the area of the sub-pixel 800 is equal to or smaller than the predetermined value. For example, when the predetermined value is 0.1, the electronic device 100 may exclude the $10^{th}$ view region 810 whose area ratio of overlap with respect to the sub-pixel 800 is 0.009746 and the fourth view region 850 whose area ratio of overlap with respect to the sub-pixel 800 is 0.099322. However, the predetermined value is merely an embodiment, and alternatively, the predetermined value may be predefined, or may be changed in response to a user input.

According to an embodiment of the disclosure, the electronic device 100 may determine application degrees of data values at first positions in respective images, with respect to view regions whose area ratios of overlap with respect to the sub-pixel 800 are equal to or greater than the predetermined value. For example, the electronic device 100 may divide area ratios of overlap between the sub-pixel 800 and each of the first view region 820, the second view region 830, and the third view region 840 by a value (=0.891478=1−0.009746−0.099322) obtained by subtracting area ratios of overlap between the sub-pixel 800 and each of the $10^{th}$ view region 810 and the fourth view region 850 from 1, thereby determining application degrees of data values at first positions in the first image, the second image, and the third image According to an embodiment of the disclosure, the electronic device 100 may determine an output value of the sub-pixel 800 by adjusting each data value in each of at least one image, according to a determined application degree. For example, the electronic device 100 may determine, by using Equation (14) below, the output value of the sub-pixel 800 by respectively adjusting the data values at the first positions in the first image, the second image, and the third image, according to the determined application degrees.

$$\text{Output}=\text{weight}_1 * V_1 + \text{weight}_2 * V_2 + \text{weight}_3 * V_3 = 0.245241 * V_1 + 0.388143 * V_2 + 0.366002 \cdot V_3 \quad \text{Equation (14)}$$

Where, Output refers to the output value of the sub-pixel 800, and $V_1$, $V_2$, and $V_3$ refer to data values at first positions in images respectively corresponding to view regions.

The electronic device 100 may determine an application degree of a data value only for a view region whose length of a center line overlapping with the sub-pixel 800 is equal to or greater than a predetermined value (not shown). For example, the electronic device 100 may exclude view regions whose lengths of center lines overlapping with the sub-pixel 800 are smaller than 1, and may determine an application degree of a data value only for a view region having a center line overlapping with the sub-pixel 800 in which a length of the center line overlapping with the sub-pixel 800 is equal to or greater than 1. However, the predetermined value is merely an embodiment, and alternatively, the predetermined value may be predefined, or may be changed in response to a user input.

Figure 9A:
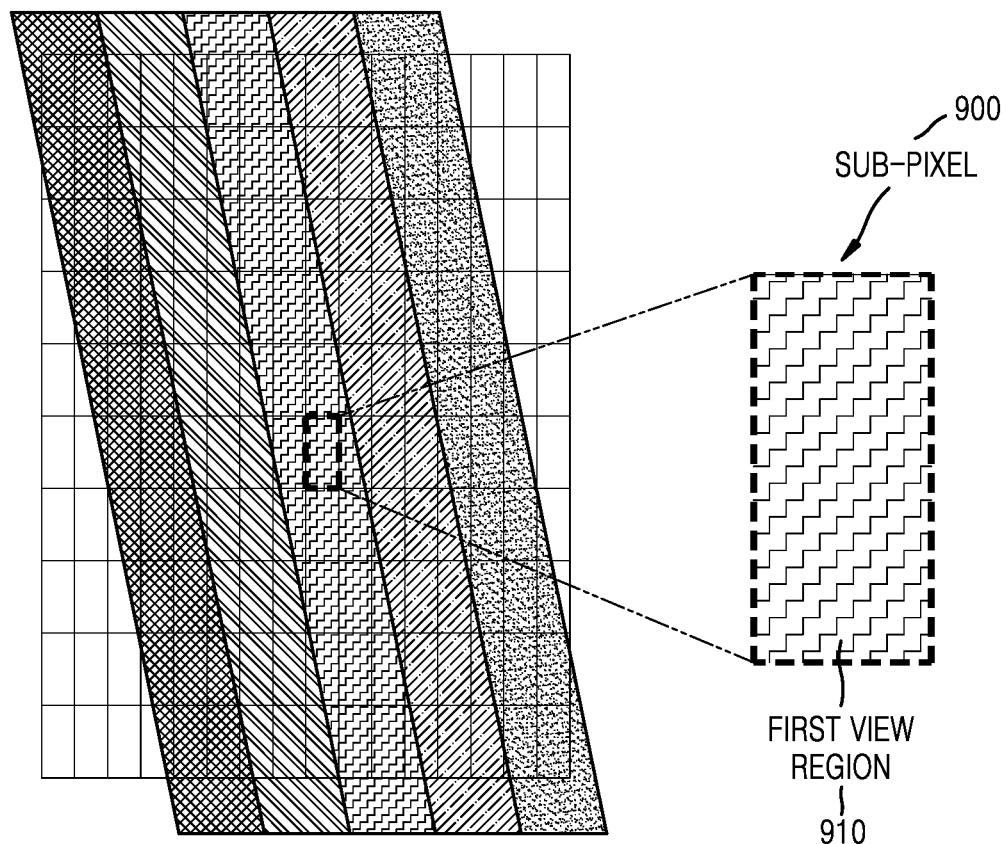
FIG. 9A is a diagram for describing a procedure in which an electronic device identifies at least one view region overlapping with a sub-pixel based on the number of views, according to an embodiment of the disclosure.
Figure 9B:
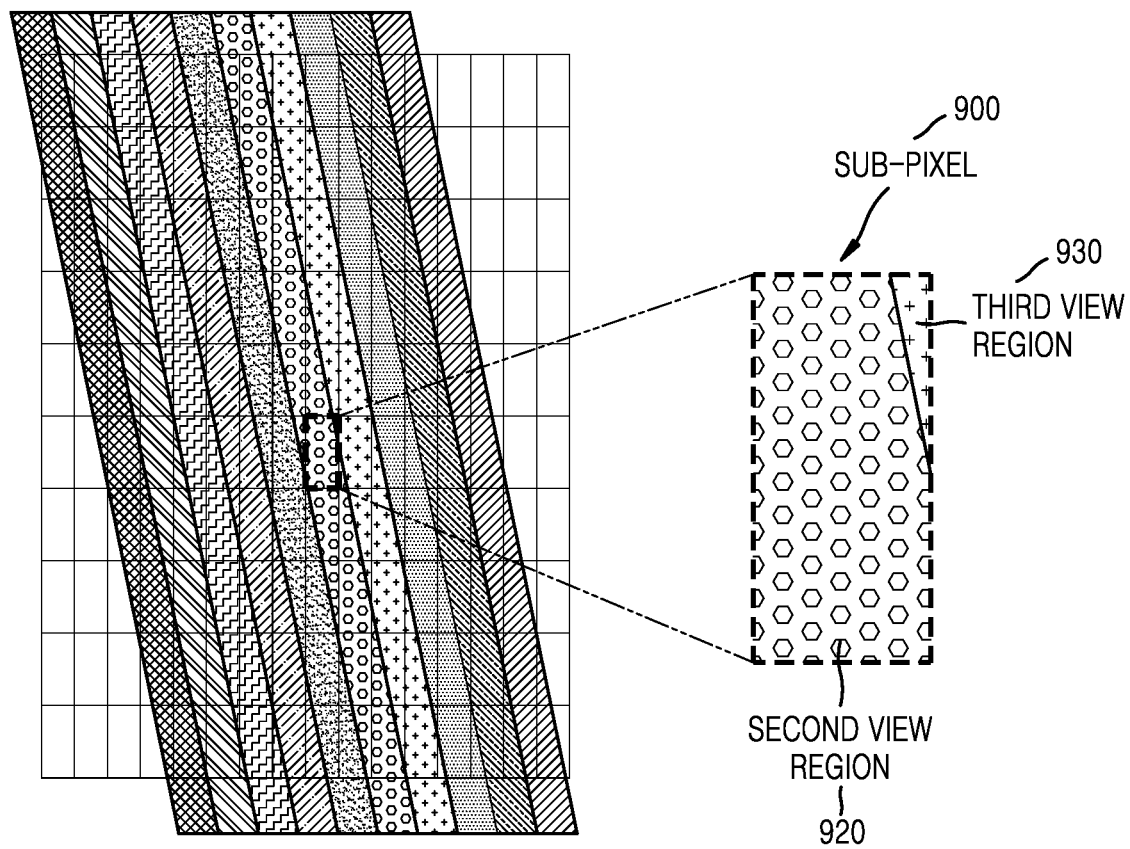
FIG. 9B is a diagram for describing a procedure in which an electronic device identifies at least one view region overlapping with a sub-pixel based on the number of views, according to an embodiment of the disclosure.
Figure 9C:
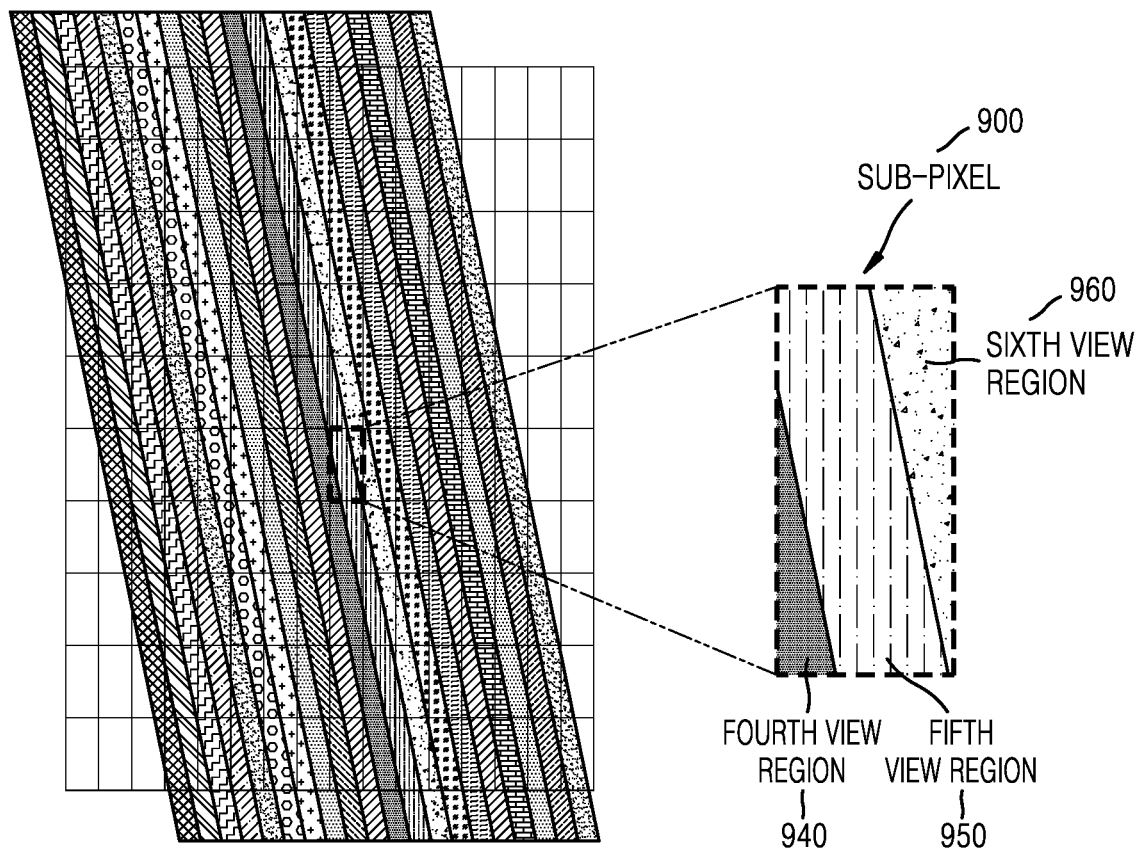
FIG. 9C is a diagram for describing a procedure in which an electronic device identifies at least one view region overlapping with a sub-pixel based on the number of views, according to an embodiment of the disclosure.

FIGS. 9A to 9C are diagrams for describing a procedure in which the electronic device 100 identifies at least one view region overlapping with a sub-pixel based on the number of views, according to an embodiment of the disclosure.

According to an embodiment of the disclosure, the electronic device 100 may determine a plurality of view regions corresponding to a plurality of views, based on the number of the plurality of views. For example, the electronic device 100 may equally divide one pitch of a lenticular lens by the number of views with parallelogrammic shapes with a same horizontal length. The electronic device 100 may respectively map the plurality of view regions to equally-divided lenticular lens regions, in correspondence to an order of the plurality of views.

Referring to FIG. 9A, when the number of the plurality of views is 5, the electronic device 100 may equally divide one pitch of a lenticular lens into 5 regions, and may respectively map the plurality of view regions to the 5 equally-divided regions of the lenticular lens. The electronic device 100 may identify a first view region 910 overlapping with a sub-pixel 900 from among the plurality of view regions. Here, the first view region 910 may indicate a virtual region corresponding to a first view.

Referring to FIG. 9B, when the number of the plurality of views is 10, the electronic device 100 may equally divide one pitch of a lenticular lens into 10 regions, and may respectively map the plurality of view regions to the 10 equally-divided regions of the lenticular lens. The electronic device 100 may identify a second view region 920 and a third view region 930 which overlap with the sub-pixel 900 from among the plurality of view regions. Here, the second view region 920 and the third view region 930 may indicate virtual regions corresponding to a second view and a third view.

Referring to FIG. 9C, when the number of the plurality of views is 20, the electronic device 100 may equally divide one pitch of a lenticular lens into 20 regions, and may respectively map the plurality of view regions to the 20 equally-divided regions of the lenticular lens. The electronic device 100 may identify a fourth view region 940, a fifth view region 950, and a sixth view region 960 which overlap with the sub-pixel 900 from among the plurality of view regions. Here, the fourth view region 940, the fifth view region 950, and the sixth view region 960 may indicate virtual regions corresponding to a fourth view, a fifth view, and a sixth view.

Referring to FIGS. 9A to 9C, even in a case where a PPI of the display 110 and a slant angle of a lenticular lens are same, when the number of the plurality of views increase, the number of view regions overlapping with the sub-pixel 900 may increase. As the number of view regions overlapping with the sub-pixel 900 increases, the electronic device 100 may control all overlapping view regions, such that a technical effect of decreasing an artifact may increase.

Figure 10A:
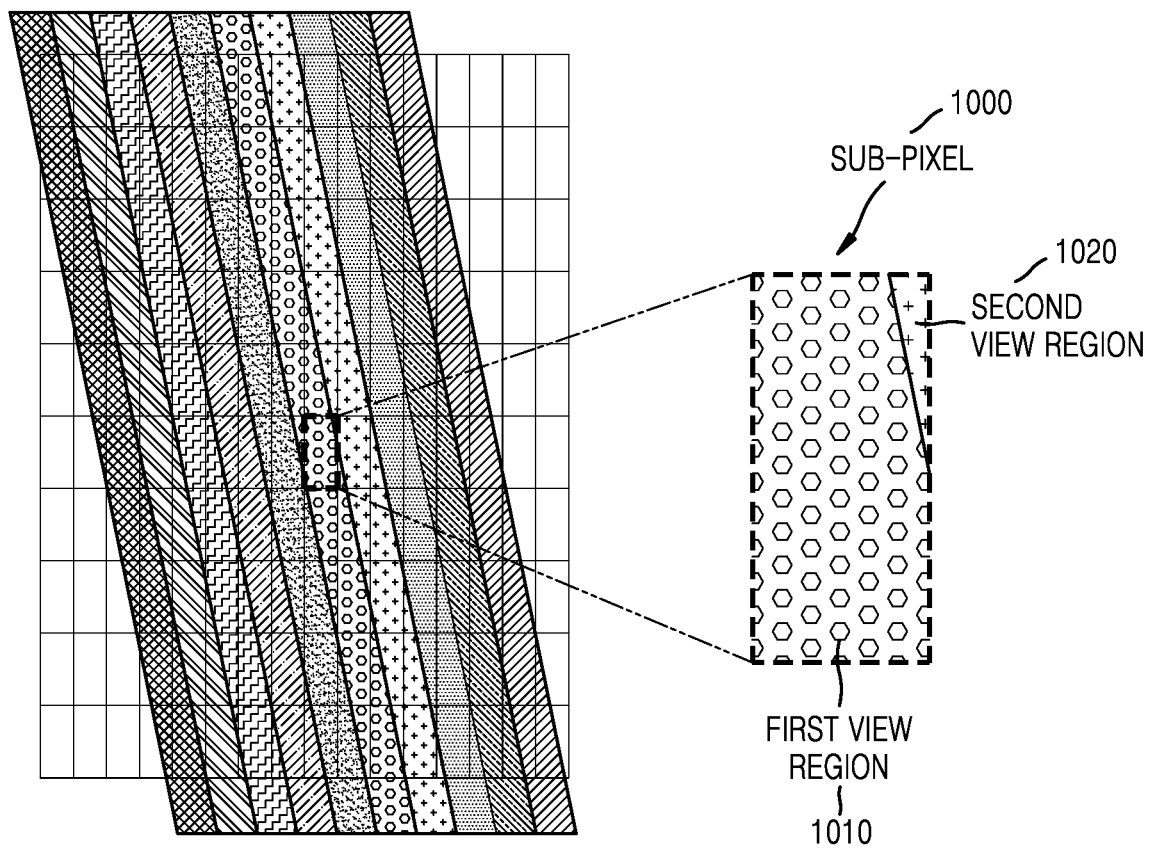
FIG. 10A is a diagram for describing a procedure in which an electronic device identifies at least one view region overlapping with a sub-pixel, based on a pixel-per-inch (PPI) of a display, according to an embodiment of the disclosure.
Figure 10B:
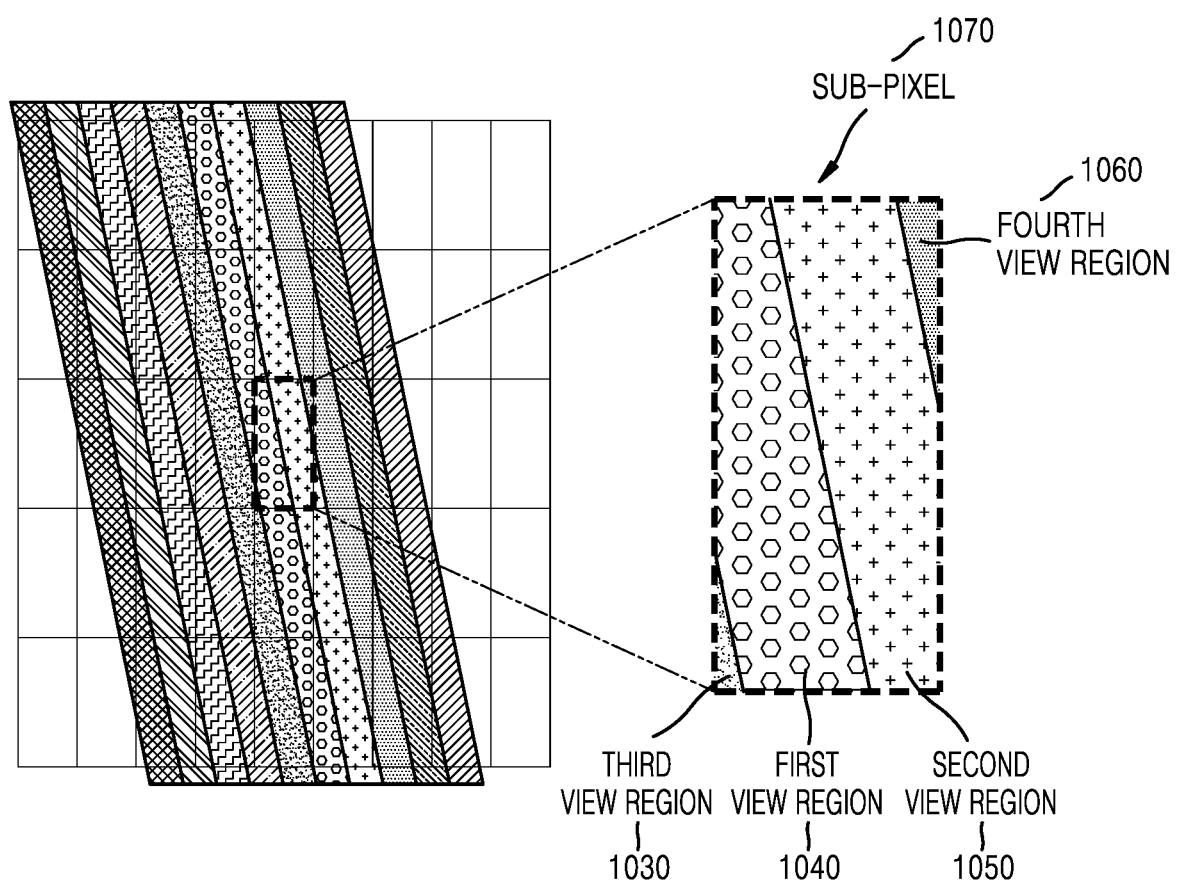
FIG. 10B is a diagram for describing a procedure in which an electronic device identifies at least one view region overlapping with a sub-pixel, based on a PPI of a display, according to an embodiment of the disclosure.

FIGS. 10A and 10B are diagrams for describing a procedure in which the electronic device 100 identifies at least one view region overlapping with a sub-pixel, based on a PPI of the display 110, according to an embodiment of the disclosure. The PPI refers to the number of pixels per 1 inch, and may have different values according to configurations of the display 110.

FIG. 10A illustrates an embodiment in which the display 110 has a relatively high PPI. According to an embodiment of the disclosure, the electronic device 100 may identify a first view region 1010 and a second view region 1020 which overlap with a sub-pixel 1000 from among a plurality of view regions. Here, the first view region 1010 and the second view region 1020 may indicate virtual regions that respectively correspond to a first view and a second view.

FIG. 10B illustrates an embodiment in which the display 110 has a relatively low PPI. According to an embodiment of the disclosure, the electronic device 100 may identify a third view region 1030, a first view region 1040, a second view region 1050, and a fourth view region 1060 which overlap with a sub-pixel 1070 from among a plurality of view regions. Here, the third view region 1030, the first view region 1040, the second view region 1050, and the fourth view region 1060 may indicate virtual regions that respectively correspond to a third view, a first view, a second view, and a fourth view.

Referring to FIGS. 10A and 10B, even in a case where the number of a plurality of views and a slant angle of a lenticular lens are equal, when the PPI of the display 110 decreases, the number of view regions overlapping with the sub-pixel 1000 may increase. As the number of view regions overlapping with the sub-pixels 1000 and 1070 increases, the electronic device 100 may control all overlapping view regions, such that a technical effect of decreasing an artifact may increase.

Figure 11A:
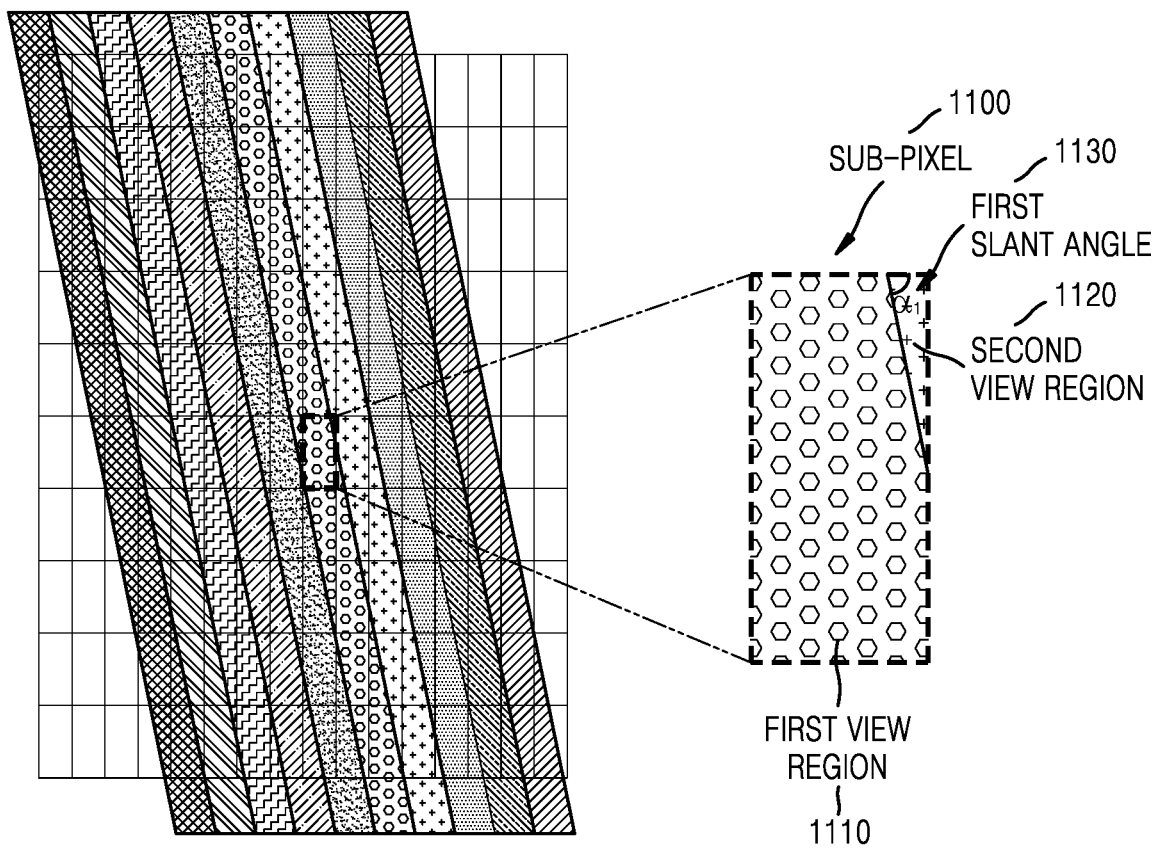
FIG. 11A is a diagram for describing a procedure in which an electronic device identifies at least one view region overlapping with a sub-pixel, based on a slant angle of a lenticular lens, according to an embodiment of the disclosure.
Figure 11B:
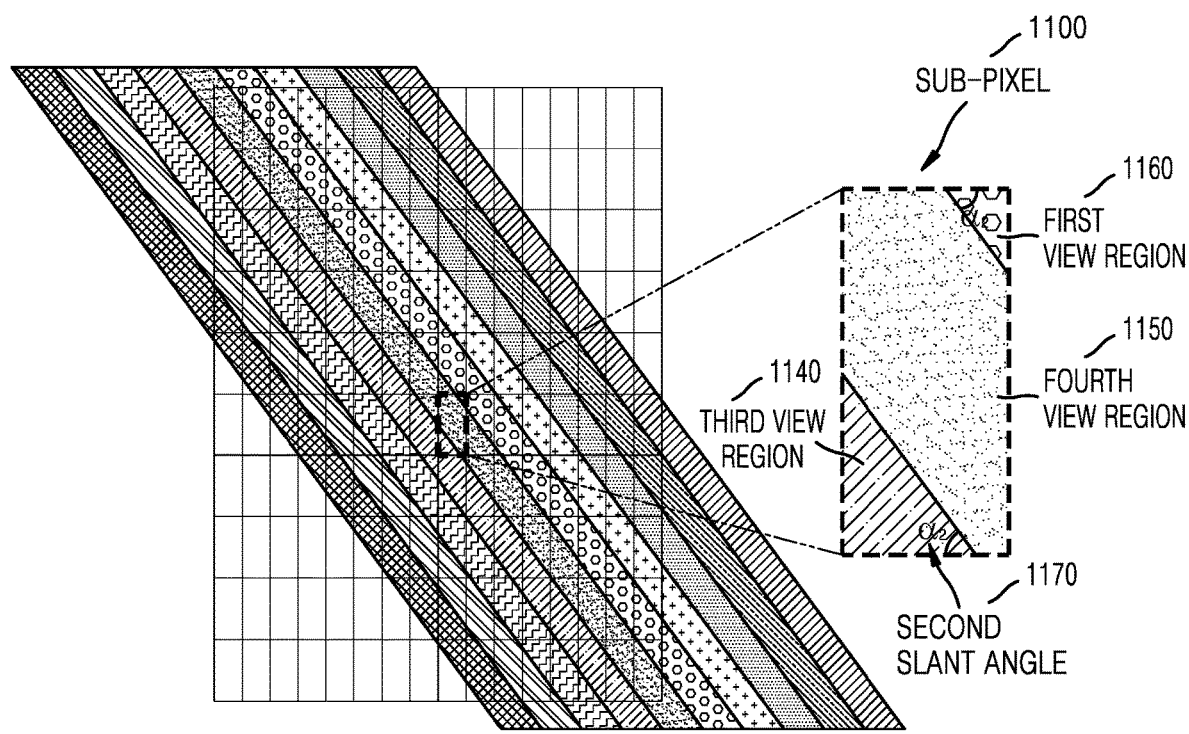
FIG. 11B is a diagram for describing a procedure in which an electronic device identifies at least one view region overlapping with a sub-pixel, based on a slant angle of a lenticular lens, according to an embodiment of the disclosure.

FIGS. 11A and 11B are diagrams for describing a procedure in which the electronic device 100 identifies at least one view region overlapping with a sub-pixel, based on a slant angle of a lenticular lens, according to an embodiment of the disclosure.

FIG. 11A illustrates an embodiment in which the lenticular lens has a relatively large first slant angle 1130. According to an embodiment of the disclosure, the electronic device 100 may identify a first view region 1110 and a second view region 1120 which overlap with a sub-pixel 1100 from among a plurality of view regions. Here, the first view region 1110 and the second view region 1120 may indicate virtual regions that respectively correspond to a first view and a second view.

FIG. 11B illustrates an embodiment in which the lenticular lens has a relatively small second slant angle 1170. According to an embodiment of the disclosure, the electronic device 100 may identify a third view region 1140, a fourth view region 1150, and a first view region 1160 which overlap with the sub-pixel 1100 from among a plurality of view regions. Here, the third view region 1140, the fourth view region 1150, and the first view region 1160 may indicate virtual regions that respectively correspond to a third view, a fourth view, and a first view.

Referring to FIGS. 11A and 11B, even in a case where the number of a plurality of views and the PPI of the display 110 are equal, when a slant angle of a lenticular lens decreases, the number of view regions overlapping with the sub-pixel 1100 may increase. As the number of view regions overlapping with the sub-pixel 1100 increases, the electronic device 100 may control all overlapping view regions, such that a technical effect of decreasing an artifact may be increase. However, slant angles $\alpha_1$ and $\alpha_2$ shown in FIGS. 1A and 11B are merely an embodiment, and the slant angle of the lenticular lens may be expressed in a different manner. For example, the slant angle of the lenticular lens may be expressed as an angle with a value of $180°-\alpha_1$ or $180°-\alpha_2$. In this case, the slant angle of the lenticular lens and the number of view regions overlapping with the sub-pixel 1100 may have a tendency being opposite to what is described above.

Figure 12:
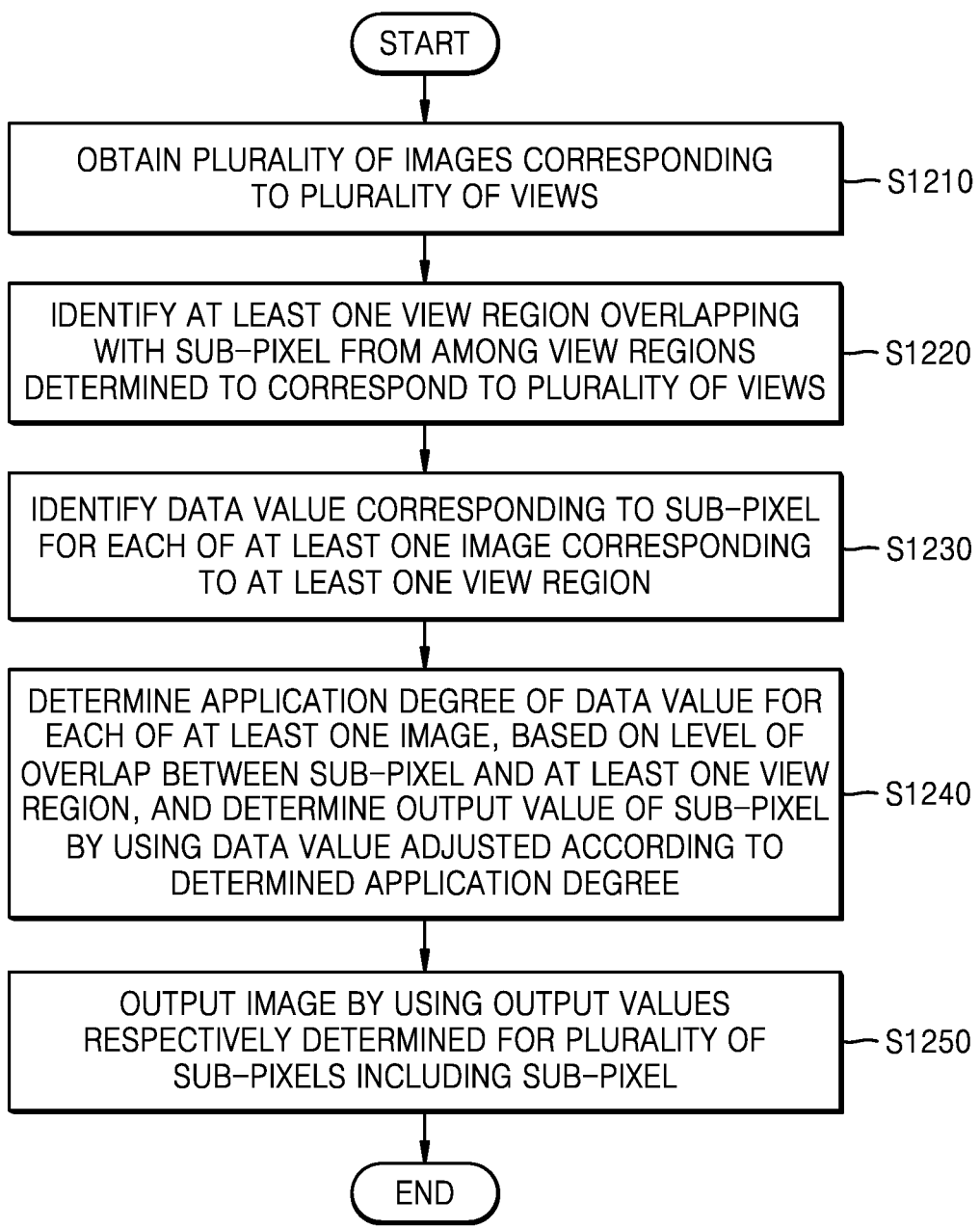
FIG. 12 is a flowchart illustrating a procedure in which an electronic device outputs an image according to an embodiment of the disclosure.

FIG. 12 is a flowchart illustrating a procedure in which an electronic device outputs an image according to an embodiment of the disclosure.

In operation S1210, the electronic device may obtain a plurality of images corresponding to a plurality of views.

In operation S1220, the electronic device may identify at least one view region overlapping with a sub-pixel from among a plurality of view regions determined to correspond to the plurality of views. According to an embodiment of the disclosure, the electronic device may determine the plurality of view regions corresponding to the plurality of views, based on the number of the plurality of views and a characteristic of a viewing zone divider.

According to an embodiment of the disclosure, the number of at least one view region overlapping with the sub-pixel may increase as a PPI of a display decreases. Alternatively, the number of at least one view region overlapping with the sub-pixel may increase as the number of the plurality of views increases. The number of at least one view region overlapping with the sub-pixel may increase as a slant angle of a lenticular lens decreases.

In operation S1230, the electronic device may identify a data value corresponding to the sub-pixel for each of at least one image corresponding to the at least one view region. According to an embodiment of the disclosure, when the sub-pixel is positioned at a first position, the data value corresponding to the sub-pixel may refer to a data value at the first position in an image.

In operation S1240, the electronic device may determine an application degree of the data value for each of the at least one image, based on a level of overlap between the sub-pixel and the at least one view region, and may determine an output value of the sub-pixel by using a data value adjusted according to the determined application degree.

According to an embodiment of the disclosure, as the level of overlap between the sub-pixel and the at least one view region increases, the application degree of the data value may increase.

According to an embodiment of the disclosure, the electronic device may determine the level of overlap between the sub-pixel and the at least one view region, based on an area where the sub-pixel and the at least one view region overlap. Here, as the area where the sub-pixel and the at least one view region overlap increases, the level of overlap between the sub-pixel and the at least one view region may increase.

According to an embodiment of the disclosure, the electronic device may determine the level of overlap between the sub-pixel and the at least one view region, based on a length of overlap between the sub-pixel and a center line of the at least one view region. Here, as the length of overlap between the sub-pixel and the center line of the at least one view region increases, the level of overlap between the sub-pixel and the at least one view region may increase.

According to an embodiment of the disclosure, the electronic device may determine the level of overlap between the sub-pixel and the at least one view region, based on a distance between a center of the sub-pixel and the at least one view region. Here, as the distance between a center of the sub-pixel and the at least one view region decreases, the level of overlap between the sub-pixel and the at least one view region may increase.

According to an embodiment of the disclosure, the electronic device may determine the application degree of the data value, except for some view regions of the at least one view region overlapping with the sub-pixel, based on a predetermined rule. The electronic device may determine an application degree of a data value only for a view region whose area overlapping with the sub-pixel is equal to or greater than a predetermined value. Alternatively, the electronic device may determine the application degree of the data value only for a view region whose value is equal to or greater than a predetermined value, the value being obtained by dividing an overlapping area of the view region with respect to the sub-pixel by an area of the sub-pixel. The electronic device may determine the application degree of the data value only for a view region having a center line overlapping with the sub-pixel in which a length of the center line overlapping with the sub-pixel is equal to or greater than a predetermined value.

In operation S1250, the electronic device may output an image by using output values respectively determined for a plurality of sub-pixels including the sub-pixel. According to an embodiment of the disclosure, the output image may indicate a multi-view image.

Figure 13:
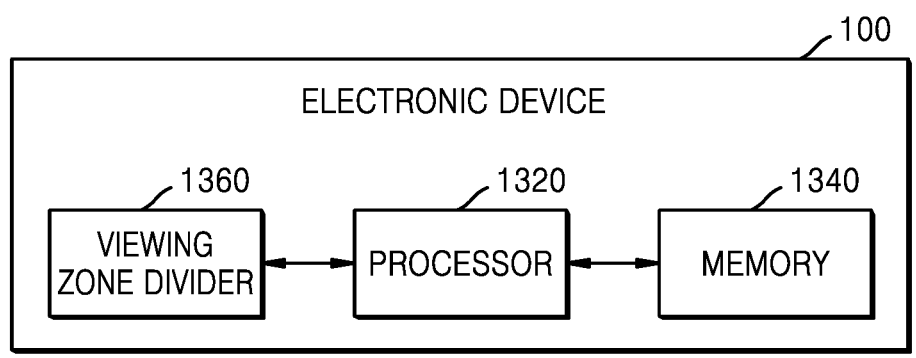
FIG. 13 is a block diagram of an electronic device according to an embodiment of the disclosure.

FIG. 13 is a block diagram of the electronic device 100 according to an embodiment of the disclosure.

According to an embodiment of the disclosure, the electronic device 100 may include a processor 1320, a memory 1340, and a viewing zone divider 1360. The processor 1320 may correspond to the processor 120 of FIG. 1, and the memory 1340 may correspond to the memory 130 of FIG. 1. Also, the viewing zone divider 1360 may be included in the display 110 of FIG. 1, and may include a lenticular lens or a parallax barrier. However, the configuration of the electronic device 100 is not limited to the above-descriptions, and the electronic device 100 may include more or less constituent elements.

According to an embodiment of the disclosure, the processor 1320 may execute at least one instruction stored in the memory 1340 to obtain a plurality of images corresponding to a plurality of views, and to identify at least one view region overlapping with a sub-pixel from among a plurality of view regions determined to correspond to the plurality of views. Also, the processor 1320 may execute the at least one instruction stored in the memory 1340 to identify a data value corresponding to the sub-pixel for each of at least one image corresponding to the at least one view region. The processor 1320 may execute the at least one instruction stored in the memory 1340 to determine an application degree of the data value for each of the at least one image, based on a level of overlap between the sub-pixel and the at least one view region, and to determine an output value of the sub-pixel by using a data value adjusted according to the determined application degree. The processor 1320 may execute the at least one instruction stored in the memory 1340 to output an image by using output values respectively determined for a plurality of sub-pixels including the sub-pixel.

According to an embodiment of the disclosure, the electronic device may determine an output value of a sub-pixel by considering all view regions overlapping with the sub-pixel, thereby effectively reducing an artifact and improving a quality of an output image.

While the disclosure has been illustrated and described with reference to various example embodiments thereof, the disclosure is not limited to the specific embodiments described. It will be understood by those skilled in the art that various changes in form and details may be made therein without departing from the spirit and scope of the disclosure.

What is claimed is:

1. A method comprising:
obtaining a plurality of images corresponding to a plurality of views;
identifying at least one view region overlapping with a sub-pixel from among a plurality of view regions corresponding to the plurality of views;
identifying a data value corresponding to the sub-pixel for each of at least one image corresponding to the at least one view region;
determining an application degree of the data value for each of the at least one image based on a level of overlap between the sub-pixel and the at least one view region, and determining an output value of the sub-pixel based on a data value adjusted according to the determined application degree; and
outputting an image based on output values respectively determined for a plurality of sub-pixels comprising the sub-pixel,
wherein the level of overlap between the sub-pixel and the at least one view region is determined based on a center line of the at least one view region, and
wherein the application degree of the data value is determined except for some view regions, whose area overlapping with the sub-pixel is equal to or smaller than a predetermined first value, of the at least one view region.

2. The method of claim 1, wherein as the level of overlap between the sub-pixel and the at least one view region increases, the application degree of the data value increases.

3. The method of claim 1, wherein the level of overlap between the sub-pixel and the at least one view region is determined based on an area of overlap between the sub-pixel and the at least one view region, and
wherein the area of overlap between the sub-pixel and the at least one view region is determined based on the center line of the at least one view region.

4. The method of claim 1, wherein the level of overlap between the sub-pixel and the at least one view region is determined based on a distance between the center line of the at least one view region and a center of the sub-pixel, and
wherein as the distance between the center line of the at least one view region and the center of the sub-pixel decreases, the level of overlap between the sub-pixel and the at least one view region increases.

5. The method of claim 1, wherein the level of overlap between the sub-pixel and the at least one view region is determined based on a length of overlap between the sub-pixel and the center line of the at least one view region.

6. The method of claim 5, wherein as the length of overlap increases, the level of overlap between the sub-pixel and the at least one view region increases.

7. The method of claim 1,
wherein the predetermined first value is greater than 0.

8. The method of claim 1,
wherein the application degree of the data value is determined except for some view regions, whose value is equal to or smaller than a predetermined second value, of the at least one view region, the value being obtained by dividing an overlapping area of the view region with respect to the sub-pixel by an area of the sub-pixel, and
wherein the predetermined second value is greater than 0.

9. The method of claim 1,
wherein the application degree of the data value is determined except for some view regions, whose length of the center line overlapping with the sub-pixel is equal to or smaller than a predetermined third value, of the at least one view region, and
wherein the predetermined third value is greater than 0.

10. A non-transitory computer-readable recording medium having recorded thereon a program for executing the method of claim 1, on a computer.

11. An electronic device comprising:
a viewing zone divider;
a memory storing at least one instruction; and
at least one processor configured to execute the at least one instruction to:
obtain a plurality of images corresponding to a plurality of views, identify at least one view region overlapping with a sub-pixel from among a plurality of view regions determined to correspond to the plurality of views based on a characteristic of the viewing zone divider,
identify a data value corresponding to the sub-pixel for each of at least one image corresponding to the at least one view region,
determine an application degree of the data value for each of the at least one image based on a level of overlap between the sub-pixel and the at least one view region, and determine an output value of the sub-pixel based on a data value adjusted according to the determined application degree, and
output an image based on output values respectively determined for a plurality of sub-pixels comprising the sub-pixel,
wherein the level of overlap between the sub-pixel and the at least one view region is determined based on a center line of the at least one view region, and
wherein the application degree of the data value is determined except for some view regions, whose area overlapping with the sub-pixel is equal to or smaller than a predetermined first value, of the at least one view region.

12. The electronic device of claim 11, wherein as the level of overlap between the sub-pixel and the at least one view region increases, the application degree of the data value increases.

13. The electronic device of claim 11, wherein the level of overlap between the sub-pixel and the at least one view region is determined based on an area of overlap between the sub-pixel and the at least one view region, and
wherein the area of overlap between the sub-pixel and the at least one view region is determined based on the center line of the at least one view region.

14. The electronic device of claim 11, wherein the level of overlap between the sub-pixel and the at least one view region is determined based on a distance between the center line of the at least one view region and a center of the sub-pixel, and
wherein as the distance between the center line of the at least one view region and the center of the sub-pixel decreases, the level of overlap between the sub-pixel and the at least one view region increases.

15. The electronic device of claim 11, wherein the level of overlap between the sub-pixel and the at least one view region is determined based on a length of overlap between the sub-pixel and the center line of the at least one view region.

16. The electronic device of claim 15, wherein, as the length of overlap increases, the level of overlap between the sub-pixel and the at least one view region increases.

17. The electronic device of claim 11,
wherein the predetermined first value is greater than 0.

18. The electronic device of claim 11,
wherein the application degree of the data value is determined except for some view regions, whose value is equal to or smaller than a predetermined second value, of the at least one view region, the value being obtained by dividing an overlapping area of the view region with respect to the sub-pixel by an area of the sub-pixel, and
wherein the predetermined second value is greater than 0.

19. The electronic device of claim 11,
wherein the application degree of the data value is determined except for some view regions, whose length of the center line overlapping with the sub-pixel is equal to or smaller than a predetermined third value, of the at least one view region,
wherein the predetermined third value is greater than 0.

20. The electronic device of claim 11, wherein the viewing zone divider comprises a lenticular lens or a parallax barrier.

\* \* \* \* \*